US012272070B2

(12) United States Patent
Yu et al.

(10) Patent No.: US 12,272,070 B2
(45) Date of Patent: *Apr. 8, 2025

(54) METHOD AND COMPUTING SYSTEM FOR OBJECT IDENTIFICATION

(71) Applicant: MUJIN, INC., Tokyo (JP)

(72) Inventors: Jinze Yu, Tokyo (JP); Xutao Ye, Tokyo (JP)

(73) Assignee: MUJIN, INC., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/460,106

(22) Filed: Sep. 1, 2023

(65) Prior Publication Data

US 2023/0410319 A1 Dec. 21, 2023

Related U.S. Application Data

(63) Continuation of application No. 16/797,129, filed on Feb. 21, 2020, now Pat. No. 11,763,459, which is a
(Continued)

(51) Int. Cl.
*G06T 7/64* (2017.01)
*G06T 7/12* (2017.01)
(Continued)

(52) U.S. Cl.
CPC .............. *G06T 7/12* (2017.01); *G06T 7/64* (2017.01); *G06V 10/245* (2022.01); *G06V 10/44* (2022.01);
(Continued)

(58) Field of Classification Search
CPC .. G06V 10/457; G06V 10/421; G06V 10/422; G06V 10/46; G06V 20/64;
(Continued)

(56) References Cited

U.S. PATENT DOCUMENTS 5,007,098 A * 4/1991 Kumagai ............. G06V 10/469
382/242
5,402,532 A * 3/1995 Epstein ................ G06T 15/405
345/422

(Continued)

FOREIGN PATENT DOCUMENTS

JP H07-088791 A 4/1995
JP H11-333770 A 12/1999
(Continued)

OTHER PUBLICATIONS

Japanese Office Action mailed Jan. 22, 2020 in corresponding Japanese Patent Application No. 2019-219218.
(Continued)

*Primary Examiner* — Aaron W Carter
(74) *Attorney, Agent, or Firm* — MEDLER FERRO WOODHOUSE & MILLS PLLC

(57) ABSTRACT

Systems and methods for processing spatial structure data are provided. The system accesses spatial structure data, which describes object structure, and which has depth information indicative of a plurality of layers for the object structure. The system further extracts, from the spatial structure data, a portion of the spatial structure data representative of one layer of the plurality of layers. The system identifies, from the portion of the spatial structure data, a plurality of vertices that describe a contour of the layer. Additionally, the system identifies convex corners of the layer based on the plurality of vertices and performs object recognition according to the convex corners.

19 Claims, 23 Drawing Sheets

Related U.S. Application Data continuation of application No. 16/578,900, filed on Sep. 23, 2019, now Pat. No. 10,614,340.

(51) Int. Cl.
    *G06V 10/24* (2022.01)
    *G06V 10/44* (2022.01)
    *G06V 20/64* (2022.01)

(52) U.S. Cl.
    CPC .... *G06V 20/64* (2022.01); *G06T 2207/10028* (2013.01); *G06T 2207/20164* (2013.01)

(58) Field of Classification Search
    CPC ........ G06V 10/245; G06V 10/44; G06T 7/64; G06T 2207/10028; G06T 2207/20164; G06T 7/12; G06F 16/901
    See application file for complete search history.

(56) References Cited

U.S. PATENT DOCUMENTS

| | | | | |
|---|---|---|---|---|
| 6,057,847 A * | 5/2000 | Jenkins | | G06T 15/40 345/422 |
| 6,775,410 B1 * | 8/2004 | Loce | | H04N 1/4092 382/209 |
| 6,920,415 B1 * | 7/2005 | Litke | | G06T 17/205 703/2 |
| 7,023,435 B1 * | 4/2006 | Litke | | G06T 17/205 345/420 |
| 7,646,917 B2 * | 1/2010 | Jung | | G06V 10/145 382/199 |
| 8,004,517 B1 * | 8/2011 | Edelsbrunner | | G06T 17/20 345/611 |
| 9,207,069 B2 * | 12/2015 | Kitamura | | G01B 11/24 |
| 9,898,859 B2 * | 2/2018 | Noma | | G06F 16/56 |
| 10,350,755 B2 * | 7/2019 | Wagner | | B25J 9/1664 |
| 10,369,701 B1 * | 8/2019 | Diankov | | G06T 7/001 |
| 10,373,336 B1 * | 8/2019 | Islam | | B25J 9/1697 |
| 10,399,227 B1 * | 9/2019 | Islam | | B25J 9/1692 |
| 10,614,340 B1 * | 4/2020 | Yu | | G06V 10/44 |
| 11,006,039 B1 * | 5/2021 | Yu | | H04N 23/80 |
| 11,103,998 B2 * | 8/2021 | Ye | | B25J 9/1653 |
| 11,158,031 B1 * | 10/2021 | Bruce | | G06T 7/181 |
| 11,403,764 B2 * | 8/2022 | Yu | | G06T 7/593 |
| 11,717,971 B2 * | 8/2023 | Ye | | B25J 9/1697 700/259 |
| 11,763,459 B2 * | 9/2023 | Yu | | G06V 10/44 382/199 |
| 11,883,966 B2 * | 1/2024 | Ye | | G06V 20/10 |
| 11,900,652 B2 * | 2/2024 | Moreira Rodrigues | | G06V 20/647 |
| 11,924,559 B2 * | 3/2024 | Yu | | H04N 23/81 |
| 2003/0107770 A1 * | 6/2003 | Klatchko | | H04N 1/4092 358/3.21 |
| 2005/0036175 A1 * | 2/2005 | Klatchko | | G06K 15/1872 382/199 |
| 2005/0129328 A1 * | 6/2005 | Saber | | G06T 5/73 382/269 |
| 2006/0001688 A1 * | 1/2006 | Chabreck | | B82Y 40/00 347/19 |
| 2006/0002603 A1 * | 1/2006 | Beauchaine | | H04N 1/4092 382/254 |
| 2007/0147699 A1 * | 6/2007 | Loce | | G06T 5/20 382/266 |
| 2008/0311346 A1 * | 12/2008 | Ohno | | B05D 5/06 428/142 |
| 2010/0283832 A1 * | 11/2010 | Lin | | G06F 18/256 348/46 |
| 2011/0178621 A1 * | 7/2011 | Heide | | B29C 64/106 700/98 |
| 2012/0227023 A1 * | 9/2012 | Bendicksen | | G06F 30/39 716/112 |
| 2012/0293635 A1 * | 11/2012 | Sharma | | G06T 7/73 348/E13.004 |
| 2013/0033484 A1 * | 2/2013 | Liao | | G06T 7/246 345/419 |
| 2014/0098124 A1 * | 4/2014 | Yoshimura | | H04N 9/3185 345/619 |
| 2015/0062125 A1 * | 3/2015 | Aguilera Perez | | G06T 7/75 345/427 |
| 2015/0178593 A1 * | 6/2015 | Shen | | G06F 18/21 382/190 |
| 2016/0165241 A1 * | 6/2016 | Park | | H04N 19/136 375/240.08 |
| 2016/0180794 A1 * | 6/2016 | Kurosawa | | G09G 3/002 345/88 |
| 2016/0379370 A1 * | 12/2016 | Nakazato | | G06T 7/50 382/103 |
| 2019/0033702 A1 * | 1/2019 | Zhang | | G06F 30/398 |
| 2019/0066328 A1 * | 2/2019 | Kwant | | G06V 10/752 |
| 2019/0096086 A1 * | 3/2019 | Xu | | G06V 20/647 |
| 2019/0347859 A1 * | 11/2019 | Jovanovic | | G06T 19/006 |
| 2021/0089808 A1 * | 3/2021 | Yu | | G06T 7/12 |
| 2021/0178583 A1 * | 6/2021 | Ye | | B25J 13/08 |
| 2021/0178593 A1 * | 6/2021 | Ye | | B25J 9/1669 |
| 2021/0256705 A1 * | 8/2021 | Yu | | G06V 10/44 |
| 2021/0258478 A1 * | 8/2021 | Yu | | H04N 23/698 |
| 2021/0325848 A1 * | 10/2021 | Rai | | B33Y 50/00 |
| 2021/0347051 A1 * | 11/2021 | Ye | | B25J 13/08 |
| 2021/0383550 A1 * | 12/2021 | Yu | | B25J 19/023 |
| 2022/0044439 A1 * | 2/2022 | Hou | | G06T 7/75 |
| 2022/0191542 A1 * | 6/2022 | Ahmadyan | | H04N 19/105 |
| 2022/0284216 A1 * | 9/2022 | Moreira Rodrigues | | G06V 10/54 |
| 2022/0351389 A1 * | 11/2022 | Yu | | G06T 7/593 |
| 2022/0371200 A1 * | 11/2022 | Yu | | G06T 7/60 |
| 2022/0375097 A1 * | 11/2022 | Yu | | G06T 7/13 |
| 2023/0036967 A1 * | 2/2023 | Talapov | | G06V 10/273 |
| 2023/0290090 A1 * | 9/2023 | Su | | G06T 17/00 |
| 2023/0410319 A1 * | 12/2023 | Yu | | G06T 7/12 |
| 2024/0017417 A1 * | 1/2024 | Ye | | H04N 23/60 |
| 2024/0070985 A1 * | 2/2024 | Urella | | G06T 7/10 |

FOREIGN PATENT DOCUMENTS

| | | |
|---|---|---|
| JP | 2010-247959 A | 11/2010 |
| JP | 2011134343 A | 7/2011 |
| JP | 2013-145525 A | 7/2013 |
| WO | 2011-070927 A | 6/2011 |

OTHER PUBLICATIONS

Notice of Reasons for Refusal issued in JP Appl. No. 2024-011449 on Feb. 4, 2025.

* cited by examiner

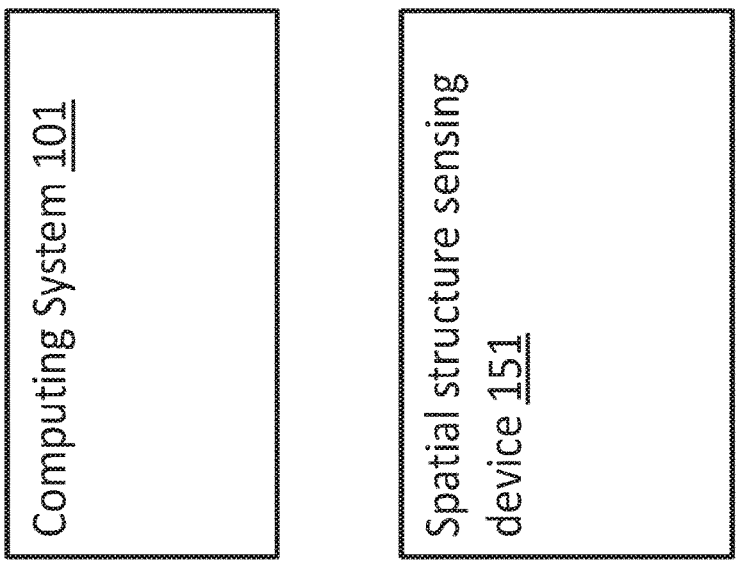

METHOD AND COMPUTING SYSTEM FOR OBJECT IDENTIFICATION

CROSS-REFERENCE TO RELATED APPLICATION(S)

This application is a continuation of U.S. patent application Ser. No. 16/797,129, entitled "METHOD AND COMPUTING SYSTEM FOR OBJECT IDENTIFICATION" and filed on Feb. 21, 2020, which is a continuation of U.S. patent application Ser. No. 16/578,900, entitled "METHOD AND COMPUTING SYSTEM FOR OBJECT IDENTIFICATION" and filed on Sep. 23, 2019.

FIELD OF THE INVENTION

The present disclosure is related to computing systems and methods for processing spatial structure data. In particular, embodiments hereof are related to detection of corners of an object whose structure is described in spatial structure data.

BACKGROUND OF THE INVENTION

As automation becomes more common, robots are being used in more environments, such as in warehousing and manufacturing environments. For instance, robots may be used to load items onto or off of a pallet in a warehouse, or to pick up objects from a conveyor belt in a factory. The movement of the robot may be fixed, or may be based on an input, such as spatial structure data obtained by one or more sensors in a warehouse or factory. Robot guidance may be assisted via object recognition performed according to the spatial structure data. Methods and techniques that improve object recognition are thus valuable.

SUMMARY

In an embodiment, a computing system including a non-transitory computer-readable medium and a processing circuit is provided. The processing circuit is configured, when spatial structure data describing object structure is stored in the non-transitory computer-readable medium, to perform the following method: access the spatial structure data, the spatial structure data having depth information indicative of a plurality of layers for the object structure; extract, from the spatial structure data, a portion of the spatial structure data representative of one layer of the plurality of layers; identify, from the portion of the spatial structure data, a plurality of vertices that describe a contour of the layer. In an embodiment, the non-transitory computer-readable medium has instructions that, when executed by the processing circuit, causes the processing circuit to perform the method described above.

BRIEF DESCRIPTION OF THE FIGURES

FIGS. 1A through 1F illustrate a spatial structure sensing device and a computing system configured for accessing and processing spatial structure data consistent with embodiments hereof.

DETAILED DESCRIPTION OF THE FIGURES

Figure 1B:
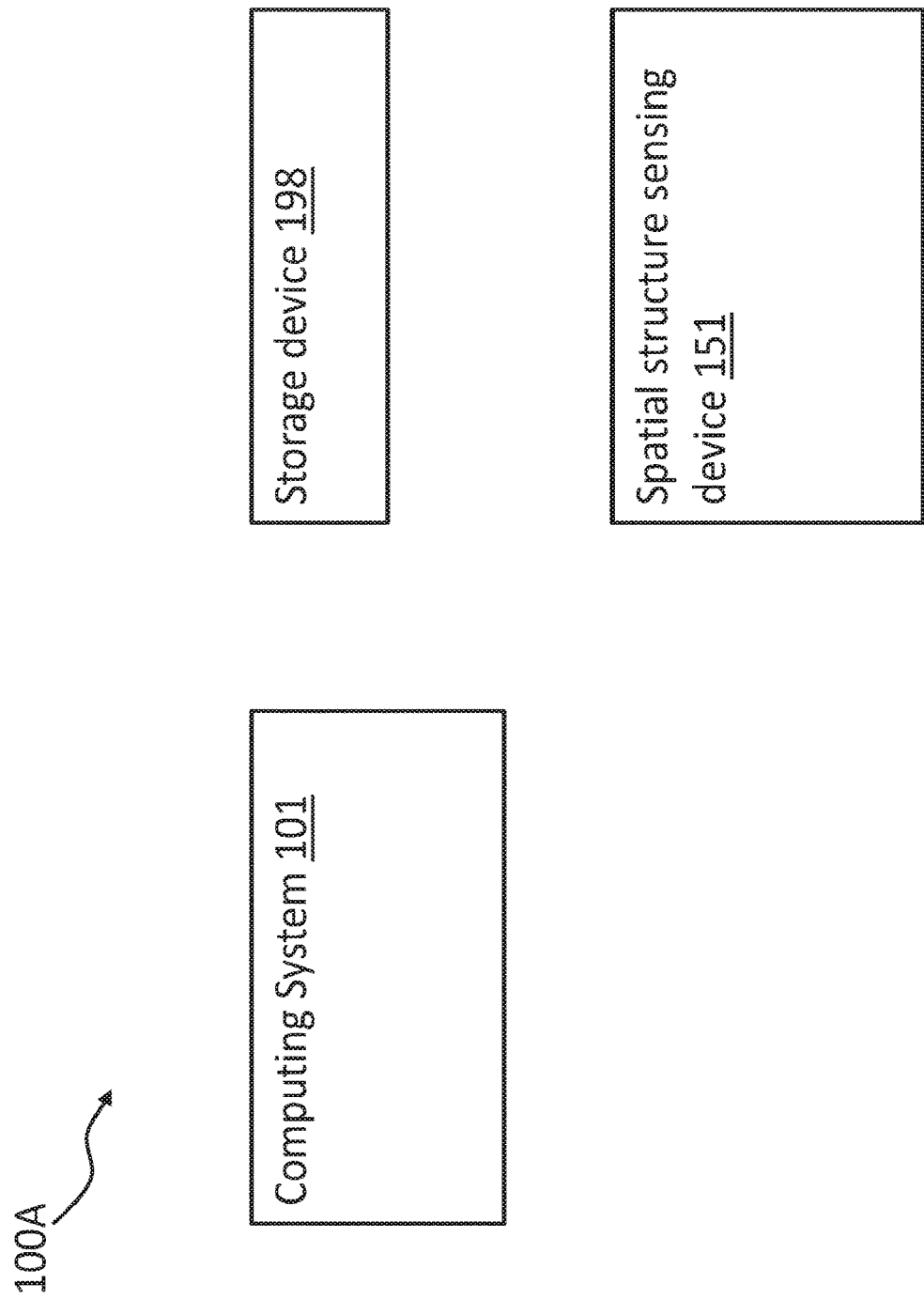

The present disclosure provides systems and methods for processing spatial structure data, such as a point cloud, and more specifically relates to identifying convex corners from the spatial structure data. In an embodiment, the spatial structure data may describe a structure of one or more objects (which may be referred to as object structure), and the convex corners may generally correspond to exterior corners of the object structure. In some cases, the convex corners may be used to perform object recognition, which may involve determining what object or type of object is being represented by the spatial structure data. If the spatial structure data is acquired by a spatial structure sensing device, such as a depth camera, the object recognition may determine what object or type of object is being or has been sensed by the spatial structure sensing device. In some cases, an output of the object recognition may be used by a robot control system to guide movement of a robot or other machinery to interact with the object or objects being sensed by the spatial structure sensing device. For instance, the robot may be configured for grasping, lifting, and/or moving objects in a warehouse, factory, or some other environment of the robot. Guiding movement of the robot may involve adapting the robot's movement to different objects or types of object, which may have different shapes, sizes, and/or orientations. More specifically, implementing such guidance may involve performing object recognition to recognize what object or type of object the robot is interacting with or is going to interact with, or to recognize a shape, size, and/or orientation of the object. Providing accurate object recognition for use by the robot control system may increase the efficiency and/or effectiveness of operation of the robots.

In one example, the robot may be interacting with a stack of individual objects, such as with a stack of boxes, as part of a de-palletizing operation. Performing object recognition in such a scenario may be challenging, because it may be difficult to detect the boundaries between individual objects and where the corners of each object begin. The object recognition may be augmented or otherwise improved through the recognition and identification of one or more contours, surfaces, edges, and/or corners of individual objects. More particularly, the object recognition may be enhanced through identifying convex corners of object structure (i.e., of a structure of one or more objects). For instance, the object recognition may rely on only the convex corners, rather than on all points identified in the spatial structure data. Using the convex corners by themselves for the object recognition may provide a sufficient level of accuracy and may reduce the amount of time or processing power needed to perform the object recognition.

In an embodiment, identifying the convex corners may be performed on a layer-by-layer basis. For instance, a stack of objects may have an object structure that forms a plurality of layers. Each layer may represent, e.g., a particular surface of the object structure (e.g., a surface that is parallel to ground), and may have a different height or depth relative to other layers of the object structure. In such an instance, a set of convex corners may be determined for each layer of the object structure. In an embodiment, convex corners may be identified from among, or more generally based on, vertices of a particular layer of the object structure. The vertices may be points that describe a contour of the layer, and thus may also be referred to as contour points.

In some implementations, identifying the convex corners may involve determining which vertices in spatial structure data are 3D corners. The 3D corners may be 3D vertices that satisfy an orthogonality criterion, wherein the 3D vertices may generally refer to a vertex in the spatial structure data that has a low likelihood of being an artifact introduced into the spatial structure data as a result of noise, interference, or other source of error. For instance, the spatial structure data may include, e.g., a point cloud that identifies or otherwise describes (e.g., via coordinates) a plurality of points which are locations on one or more surfaces of an object structure. Some of the points identified in the point cloud may be artifacts that do not correspond to any physical point in the object structure. In other words, some points identified in the point cloud may appear as respective vertices of the structure, but those vertices which appear in the spatial structure data may be artifacts that do not represent any actual physical vertex on the object structure. Thus, one aspect of determining whether a vertex is a 3D vertex or is a 3D corner herein relates to determining whether a particular vertex identified from the spatial structure data represents a physical vertex on the object structure, or whether the identified vertex is an artifact.

In an embodiment, the determination of whether a vertex identified from the spatial structure data is an artifact may be based on whether the vertex satisfies a length criterion or multiple length criteria. The length criterion may be used to evaluate, e.g., whether a distance between a particular vertex in the spatial structure data and its neighboring vertex meets or exceeds a defined length threshold (also referred to as a threshold length). The length criterion may reflect some situations in which a features (e.g., an edge of an object structure) that appears as a result of an artifact in spatial structure data is likely to be small in size relative to other actual physical features of the object structure data because, e.g., the imaging noise or other source of error which caused the artifact may affect only a localized portion of the spatial structure data. Thus, a vertex that results from or is part of the artifact may likely be located close to a neighboring vertex or some other neighboring feature. In such an example, a vertex which fails to satisfy the length criterion may be considered likely to be an artifact and may be ignored or excluded from being used to identify convex corners. A vertex which satisfies the length criterion or length criteria may be eligible to be used to identify convex corners.

In an embodiment, an orthogonality criterion may be evaluated for a 3D vertex (or any other vertex) to determine whether the 3D vertex can be a 3D corner. More specifically, the vertex may be an intersection of two edges of the object structure. In this embodiment, the 3D corner may include those 3D vertices in which the two edges are orthogonal or substantially orthogonal to each other (also referred to as being substantially perpendicular to each other). At least some of the convex corners may be selected or otherwise identified from among the 3D corners. In an embodiment, the orthogonality criterion may also contribute to detecting and excluding vertices that may be an artifact. In an embodiment, the orthogonality criterion may simplify object recognition for situations in which most or all the objects to be recognized (e.g., boxes) are expected to have orthogonal corners.

In an embodiment, identifying the convex corners may involve determining a convexity of a 3D corner. In some cases, the convexity of the vertex may be determined based on a cross product between two vectors that point away from the vertex, and/or towards two respective neighboring vertices. The cross product may be or may include a cross product vector that is orthogonal to two vectors. In this embodiment, the convexity of the vertex may be determined based on whether the cross product vector points in or along a defined direction. In some cases, the plurality of vertices may be evaluated over multiple iterations, in a sequence that progresses through the vertices in a clockwise manner or a counterclockwise manner along the contour of the layer. In such cases, the defined direction against which the cross product vector is compared may be based on whether the multiple iterations are progressing through the vertices in a clockwise manner or whether the multiple iterations are progressing through the vertices in a counterclockwise manner.

In an embodiment, if a vertex does not satisfy an orthogonality criterion, a fused corner may be generated. The fused corner may be an orthogonal corner that is near the vertex and is generated based on the vertex. For instance, the vertex may be at an intersection point of a first edge and a second edge that are not substantially orthogonal. Generating the fused corner may involve identifying a third edge that is orthogonal to the first edge (or to the second edge). In some cases, the edges may correspond to vectors, or to lines extending along the vectors, as discussed below in more detail. If the fused corner is convex, it may be identified as a convex corner.

In some instances, the object recognition may involve determining generating or modifying a detection hypothesis based on the convex corners. In some instances, the object recognition may involve filtering a detection hypothesis based on the convex corners. The detection hypothesis may relate to, e.g., attempting to match spatial structure data to a template, such as by mapping template features of the template to the spatial structure data. The template may describe object structure for an object or type of object, and the template features may identify, e.g., a shape of the object structure, its corners or edges, or other features of the object structure. The convex corners may, e.g., simplify the process of mapping the template features to the spatial structure data, and/or improve an accuracy of that mapping. For instance, the object recognition may compare the template the features to only the convex corners, rather than to all of the points identified in the spatial structure data.

FIG. 1A illustrates a system 100 for generating and processing spatial structure data (spatial structure data is discussed below in more detail). The system 100 may include a computing system 101 and a spatial structure sensing device 151. In an embodiment, the spatial structure sensing device 151 may be configured to generate spatial structure data and may be configured to make the spatial structure data available to the computing system 101, which may be configured to process the spatial structure data. In some instances, the computing system 101 and the spatial structure sensing device 151 may be located in the same premises, such as a warehouse or factory. In some instances, the computing system 101 and the spatial structure sensing device 151 may be remote from each other.

In an embodiment, the spatial structure sensing device 151 may be configured to make the spatial structure data available via a communication interface and/or a data storage device (which may also be referred to as a storage device). For instance, FIG. 1B depicts a system 100A that is an embodiment of the system 100 of FIG. 1A. The system 100A includes the computing system 101, the spatial structure sensing device 151, and further includes a data storage device 198 (or any other type of a non-transitory computer-readable medium). The data storage device 198 may be part of the spatial structure sensing device 151 or may be separate from the spatial structure sensing device 151. For instance, the storage device 198 may be located in a data center that is remote from the spatial structure sensing device 151 and may receive and store spatial structure data generated by the spatial structure sensing device 151. In this embodiment, the computing system 101 may be configured to access the spatial structure data by retrieving (or, more generally, receiving) the data from the data storage device 198.

In FIG. 1B, the storage device 198 may include any type of non-transitory computer-readable medium (or media), which may also be referred to as a non-transitory computer readable storage device. Such non-transitory computer-readable medium or storage device may be configured to store and provide access to data. Examples of the non-transitory computer readable medium or storage device may include, but is not limited to, an electronic storage device, a magnetic storage device, an optical storage device, an electromagnetic storage device, a semiconductor storage device, or any suitable combination thereof, for example, such as a computer diskette, a hard disk, a random access memory (RAM), a read-only memory (ROM), an erasable programmable read-only memory (EPROM or Flash memory), a solid state drive, a static random access memory (SRAM), a portable compact disc read-only memory (CD-ROM), a digital versatile disk (DVD), and/or a memory stick.

Figure 1C:
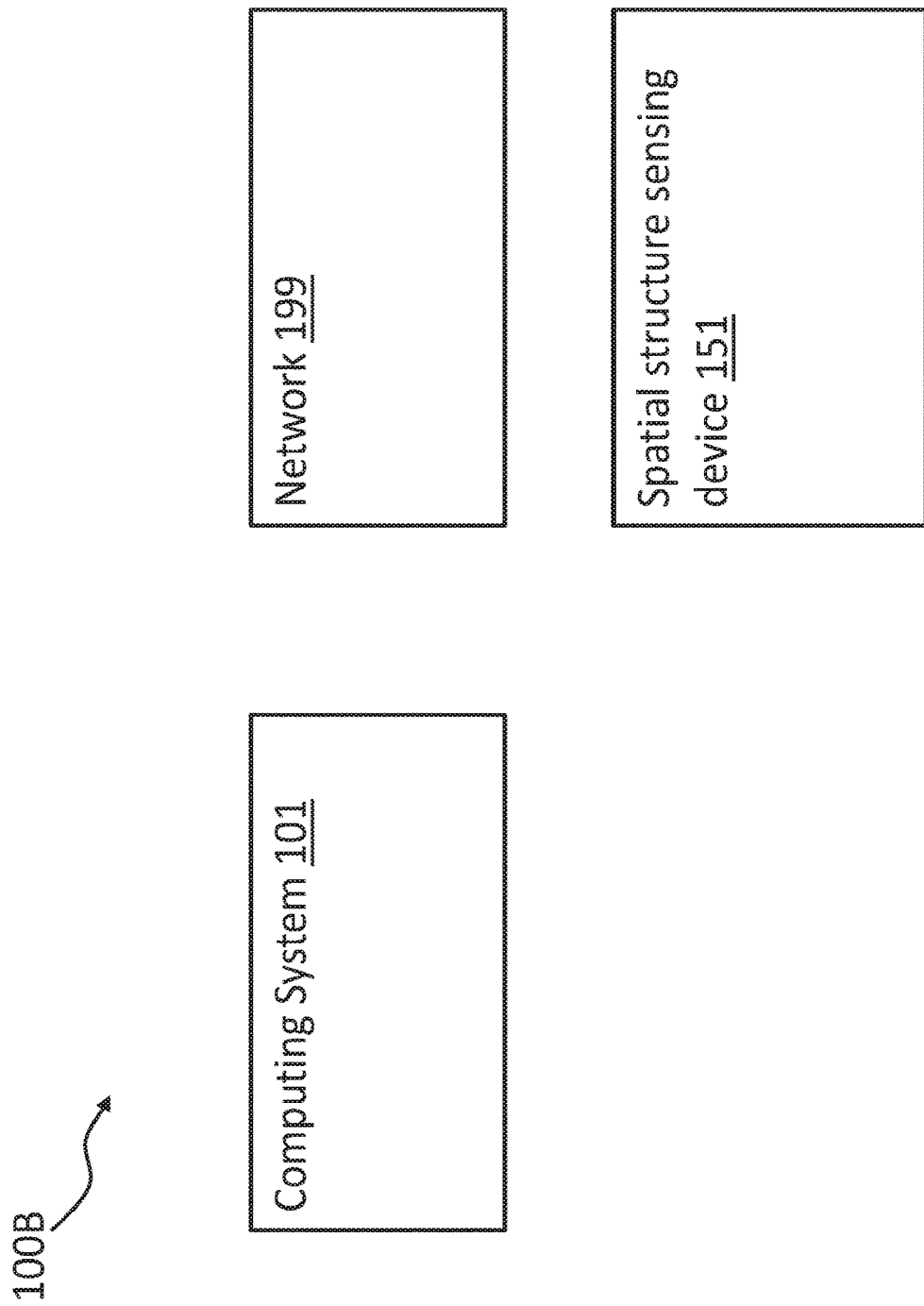

In an embodiment, the computing system 101 and the spatial structure sensing device 151 may be configured to communicate spatial structure data via a network. For instance, FIG. 1C depicts a system 100B that is an embodiment of system 100 of FIG. 1A and/or of the system 100A in FIG. 1B. In system 100B, the computing system 101 may be configured to receive spatial structure data from the spatial structure sensing device 151 via a network 199. The network 199 may provide an individual network connection or a series of network connections to permit the computing system 101 to receive spatial structure data consistent with the embodiments hereof.

In FIG. 1C, the network 199 may be connected via wired or wireless links. Wired links may include Digital Subscriber Line (DSL), coaxial cable lines, or optical fiber lines. Wireless links may include Bluetooth®, Bluetooth Low Energy (BLE), ANT/ANT+, ZigBee, Z-Wave, Thread, Wi-Fi®, Worldwide Interoperability for Microwave Access (WiMAX®), mobile WiMAX®, WiMAX®-Advanced, NFC, SigFox, LoRa, Random Phase Multiple Access (RPMA), Weightless-N/P/W, an infrared channel or a satellite band. The wireless links may also include any cellular network standards to communicate among mobile devices, including standards that qualify as 2G, 3G, 4G, or 5G. Wireless standards may use various channel access methods, e.g., FDMA, TDMA, CDMA, or SDMA. In some embodiments, different types of data may be transmitted via different links and standards. In other embodiments, the same types of data may be transmitted via different links and standards. Network communications may be conducted via any suitable protocol, including, e.g., http, tcp/ip, udp, ethernet, ATM, etc.

The network 199 may be any type and/or form of network. The geographical scope of the network may vary widely and the network 199 can be a body area network (BAN), a personal area network (PAN), a local-area network (LAN), e.g., Intranet, a metropolitan area network (MAN), a wide area network (WAN), or the Internet. The topology of the network 199 may be of any form and may include, e.g., any of the following: point-to-point, bus, star, ring, mesh, or tree. The network 199 may be of any such network topology as known to those ordinarily skilled in the art capable of supporting the operations described herein. The network 199 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv4 and IPv4), or the link layer. The network 199 may be a type of broadcast network, a telecommunications network, a data communication network, or a computer network.

In an embodiment, the computing system 101 and the spatial structure sensing device 151 may be able to communicate via a direct connection rather than a network connection. For instance, the computing system 101 in such an embodiment may be configured to receive the spatial structure data via a dedicated communication interface, such as a RS-232 interface, a universal serial bus (USB) interface, and/or via a local computer bus, such as a peripheral component interconnect (PCI) bus.

Figure 1D:
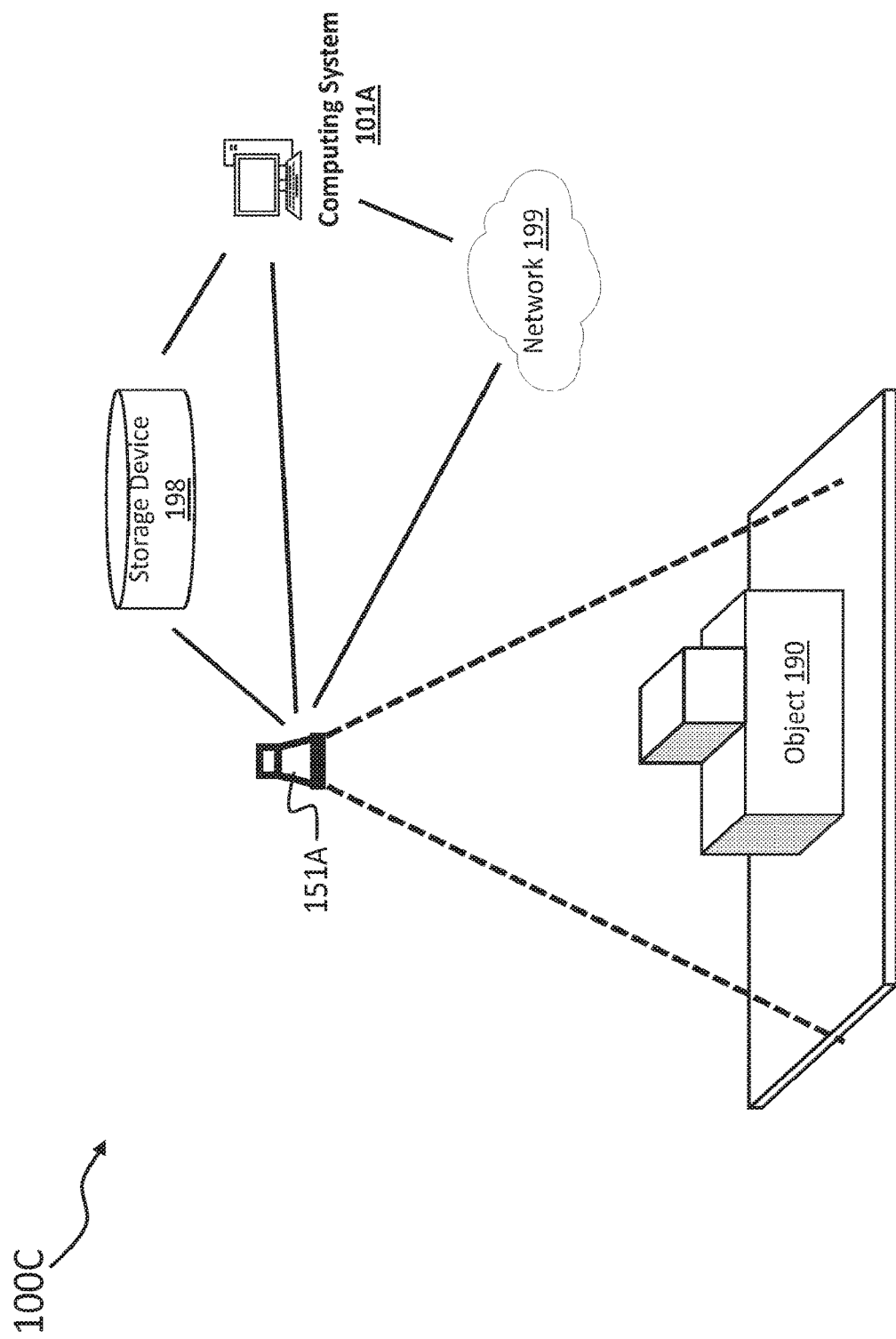

FIG. 1D illustrates a system 100C, which may be an embodiment of system 100, for generating and processing spatial structure data. The system 100C includes a computing system 101A, a spatial structure sensing device 151A, the storage device 198, and the network 199. The spatial structure sensing device 151A is configured to capture or otherwise generate spatial structure data that describes a structure of one or more objects 190. The computing system 101A is configured to access and process spatial structure data. In the embodiment of FIG. 1D, the computing system 101A may be a desktop computer, which is an embodiment of the computing system 101 of FIG. 1A, and the spatial structure sensing device 151A may be a depth-sensing camera (e.g., a time-of-flight camera or structured light camera), which is an embodiment of the spatial structure sensing device 151 of FIG. 1A. Further in this example, the computing system 101A may access the spatial structure data via any suitable means. For example, the computing system 101A may retrieve (or, more generally, receive) the spatial structure data from the spatial structure sensing device 151 via the storage device 198, over the network 199, and/or via a direct connection to the spatial structure sensing device 151A.

Figure 1E:
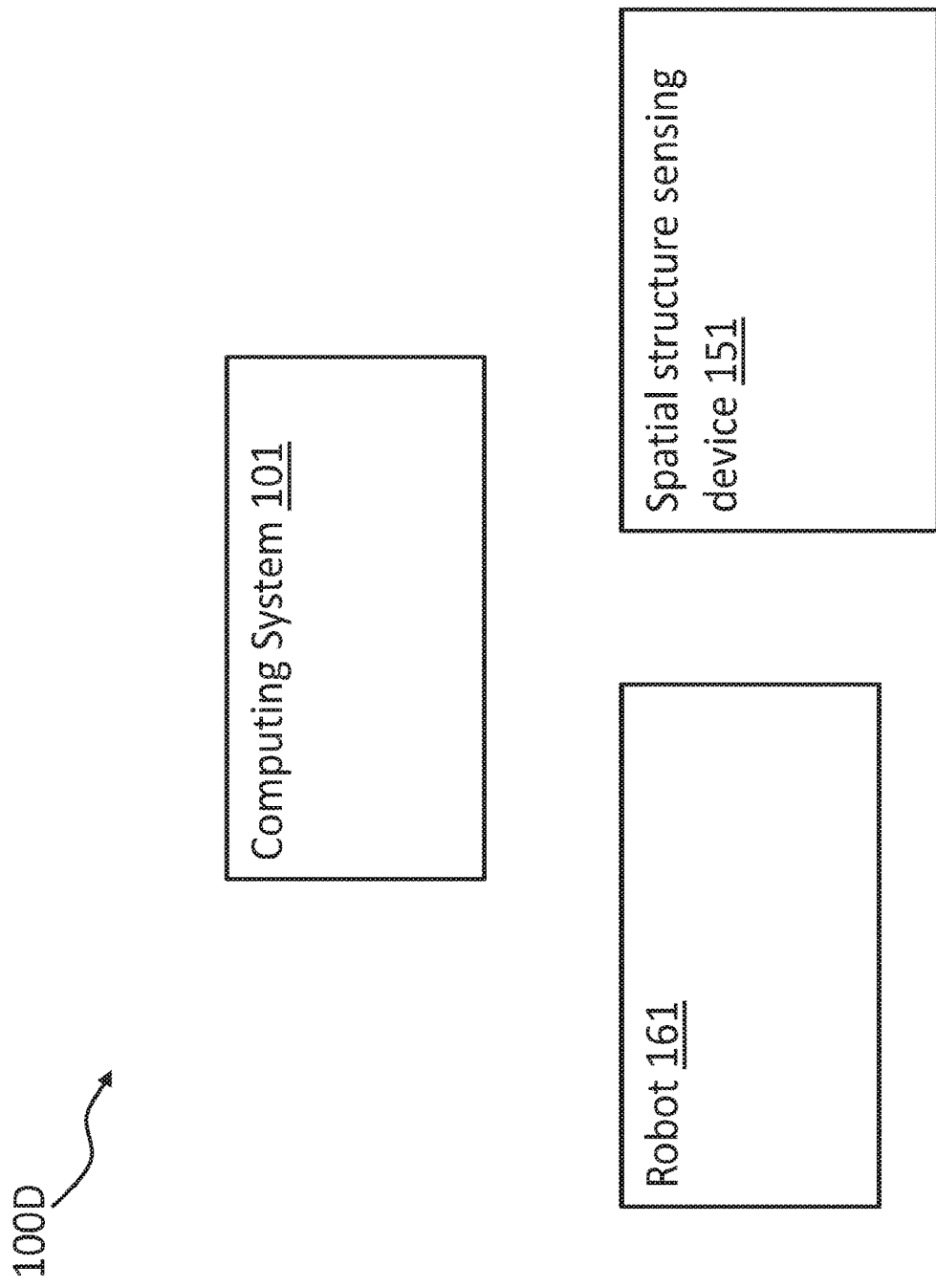

In an embodiment, as stated above, the spatial structure data may be generated to facilitate the control of a robot. For instance, FIG. 1E illustrates a robot operation system 100D (which is an embodiment of system 100) that is able to generate and process spatial structure data, and to control a robot 161 based on the processing. For instance, the spatial structure sensing device 151 may be a depth-sensing camera that is configured to generate spatial structure data that describes a structure of one or more objects in a field of view of the depth-sensing camera. The computing system 101 may be configured to receive the spatial structure data and use the data to determine a size, shape, location, and/or orientation of the one or more objects. In these instances, movement of the robot 161 may be controlled to interact with the one or more objects based on their determined size, shape, location, and/or orientation.

In an embodiment, the computing system 101 may be configured to directly control the movement of the robot 161 based on information determined from processing the spatial structure data. For example, the computing system 101 may be configured to generate one or more movement commands (e.g., motor commands) based on the determined information, and communicate the one or more movement commands to the robot 161. In such an example, the computing system 101 may act as a robot control system (also referred to as a robot controller).

Figure 1F:
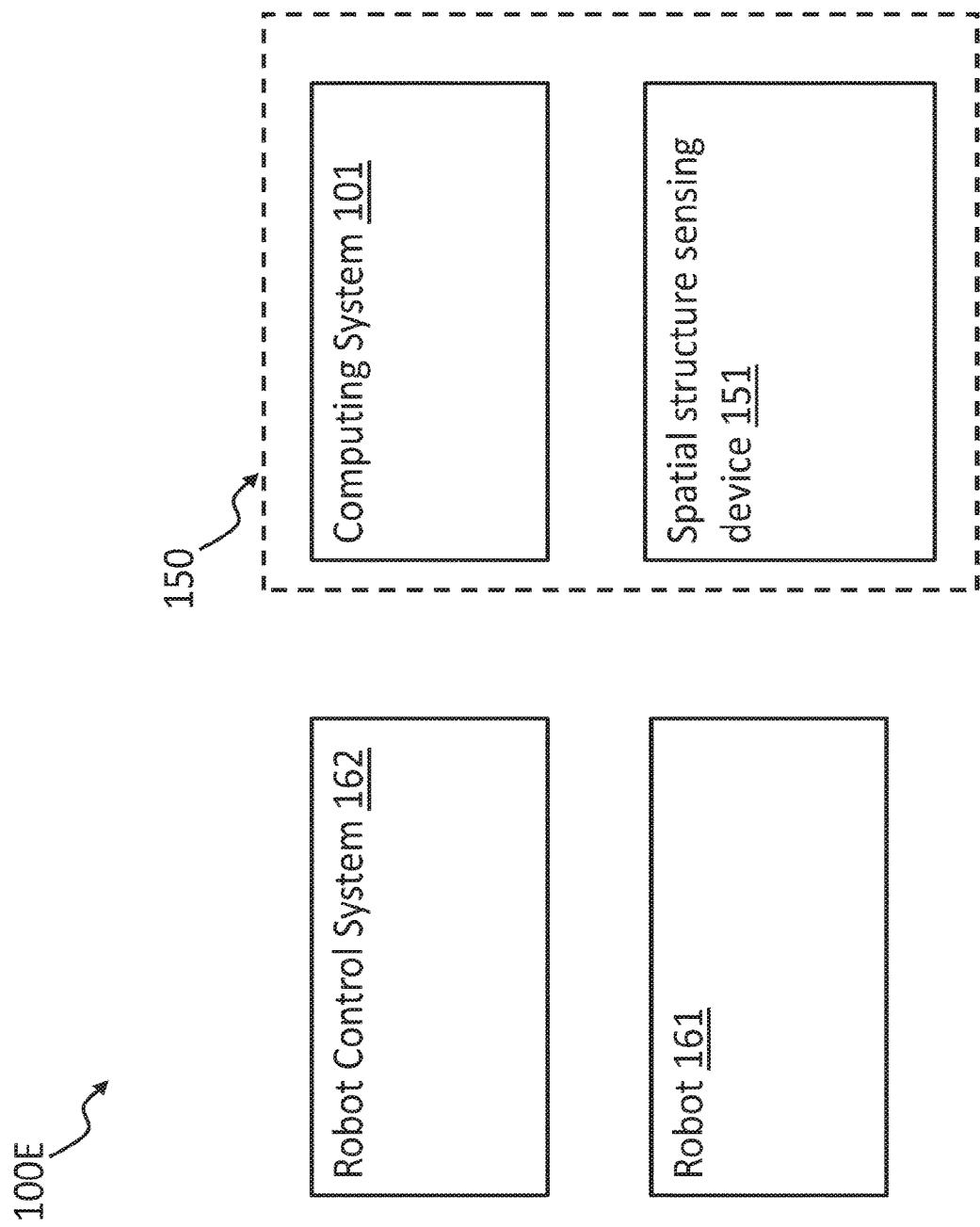

In another embodiment, the computing system 101 may be configured to communicate the determined information to a robot control system that is separate from the computing system 101, and the robot control system may be configured to control movement of the robot 161 (e.g., by generating one or more movement commands) based on the determined information. For instance, FIG. 1F depicts a robot operation system 100E (which is an embodiment of the system 100 of FIG. 1A and the system 100D of FIG. 1E) that includes a robot control system 162. More specifically, the computing system 101 and the spatial structure sensing device 151 in FIG. 1F may form a vision system 150 that is configured to provide to the robot control system 162 information about an environment of the robot 161, and more specifically about objects in that environment that the robot 161 is to manipulate, or to interact with in some other manner. The computing system 101 may function as a vision controller that is configured to process spatial structure data to determine that information, which may include, e.g., a classification that indicates a type of the object, a shape or size of the objects, and/or a location of the objects relative to the robot 161 (e.g., relative to a robot arm of the robot 161). The computing system 101 may be configured to communicate the determined information to the robot control system 162, which may be configured to generate one or more movement commands based on the information received from the computing system 101.

As stated above, the spatial structure sensing device 151 of FIGS. 1A through 1F may be configured to generate spatial structure data which describes a structure of one or more objects in an environment of the spatial structure sensing device 151. As used herein, spatial structure data refers to any type of data (also referred to as information) that describes a structure of one or more physical objects (also referred to as one or more objects), and more specifically may include data about the shape, orientation, arrangement, and/or size of the one or more physical objects. In an embodiment, the spatial structure data may include location data that describes a location of the structure relative to the spatial structure sensing device 151, relative to the robot 161, or relative to some other element.

In an embodiment, the spatial structure data may comprise image data, and any and all systems, methods, and techniques described herein with respect to spatial structure data, unless explicitly stated otherwise, may be applied equally to the image data, which is a form of the spatial structure data. For instance, the spatial structure data may comprise an image that is or includes a depth map. The depth map may be an image having a plurality of pixels and that further includes depth information. The depth information may include, e.g., respective depth values assigned to or included with some or all of the pixels. The depth value for a particular pixel may indicate depth of a location represented by or otherwise corresponding to that pixel.

More specifically, the depth information represents information indicative of distances along an axis that is orthogonal to an imaginary plane on which the spatial structure sensing device 151 is located. In some cases, if the spatial structure sensing device 151 is a camera having an image sensor, the imaginary plane may be an image plane defined by the image sensor. In an embodiment, depth information, as used herein may be indicative of a distance away from the spatial structure sensing device 151. In an embodiment, depth information may be manipulated to represent relative distances from any suitable plane parallel to the imaginary plane on which the spatial structure sensing device 151 is located. For instance, the suitable plane may be defined by a ceiling, floor, or wall of a room, or a platform on which one or more objects are located. In an example, if the spatial structure sensing device 151 is located above one or more objects, depth information may be representative of a height of various points and surfaces of the one or more objects relative to a surface on which the one or more objects are disposed. In another example, if one or more objects are displaced or otherwise offset horizontally from the spatial structure sensing device 151, depth information may be indicative of how far horizontally the one or more objects extend away from the spatial structure sensing device. In an embodiment, the depth information of the spatial structure data may be indicative of and may be organized according to a plurality of depth layers of the one or more objects, as discussed below in more detail. The plurality of depth layers includes multiple layers, each indicative of a discrete level of depth measured along an axis orthogonal to the imaginary plane at which the spatial structure sensing device 151 is located. In some embodiments, each layer may represent a single depth value. In some embodiments, each layer may represent a range of depth values. Thus, although depth information may include continuously variable distance measurements, a finite number of layers may be used to capture all of the depth information.

In an embodiment, the spatial structure data may be a point cloud. As used herein, a point cloud may identify a plurality of points that describe object structure (i.e., describe a structure of one or more objects). The plurality of points may be, e.g., respective locations on one or more surfaces of the object structure. In some cases, the point cloud may include a plurality of coordinates that identify or otherwise describe the plurality of points. For instance, the point cloud may include a series of Cartesian or polar coordinates (or other data values) that specify respective locations or other features of the object structure. The respective coordinates may be expressed with respect to a coordinate system of the spatial structure sensing device 151, or with respect to some other coordinate system. In some cases, the respective coordinates are discrete and spaced apart from each other but may be understood to be representative of a contiguous surface of the object structure. In an embodiment, the point cloud may be generated from a depth map or other image data (e.g., by the computing system 101).

In some embodiments, the spatial structure data may further be stored according to any appropriate format, such as polygon or triangular mesh models, non-uniform rational basis spline models, CAD models, parameterization of primitives (e.g., a rectangle may be defined according to a center and extensions in the x, y, and z directions, a cylinder can be defined by a center, a height, an upper radius, and a lower radius, etc.), etc.

As stated above, the spatial structure data is captured or otherwise generated via the spatial structure sensing device 151. In an embodiment, the spatial structure sensing devices may be or include a camera or any other image sensing device. The camera may be a depth-sensing camera, such as a time-of-flight (TOF) camera or a structured light camera. The camera may include an image sensor, such as a charge coupled devices (CCDs) sensor and/or complementary metal oxide semiconductors (CMOS) sensor. In an embodiment, the spatial structure sensing device may include lasers, a LIDAR device, an infrared device, a light/dark sensor, a motion sensor, a microwave detector, an ultrasonic detector, a RADAR detector, or any other device configured to capture spatial structure data.

As further stated above, the spatial structure data generated by the spatial structure sensing device 151 may be processed by the computing system 101. In an embodiment, the computing system 101 may include or be configured as a server (e.g., having one or more server blades, processors, etc.), a personal computer (e.g., a desktop computer, a laptop computer, etc.), a smartphone, a tablet computing device, and/or other any other computing system. In an embodiment, any or all of the functionality of the computing system 101 may be performed as part of a cloud computing platform. The computing system 101 may be a single computing device (e.g, a desktop computer), or may include multiple computing devices.

Figure 2A:
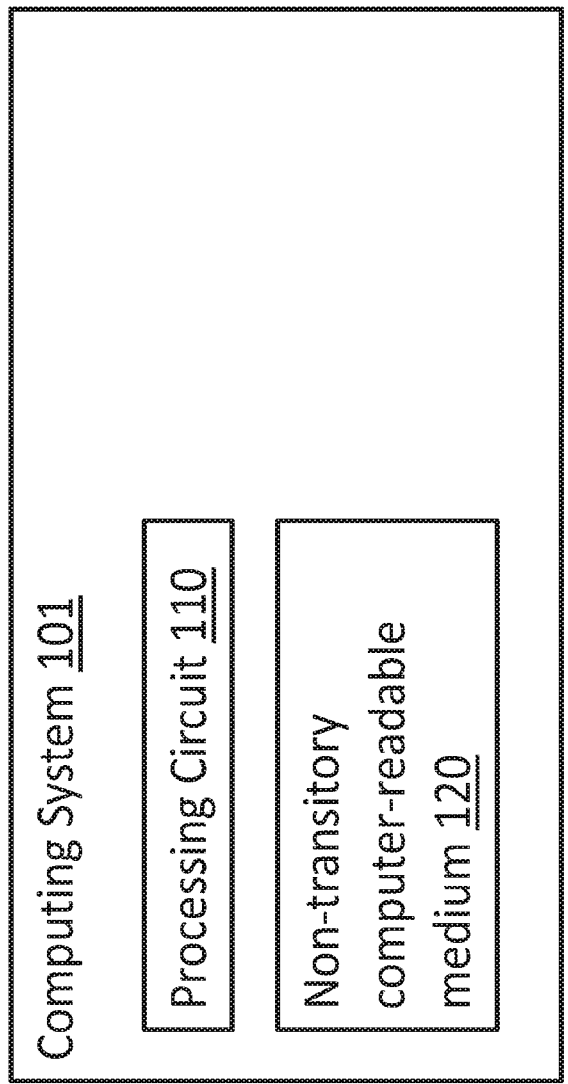
FIGS. 2A-2C provide block diagrams that illustrate a computing system configured to process spatial structure data consistent with embodiments hereof.

FIG. 2A provides a block diagram that illustrates an embodiment of the computing system 101. The computing system 101 includes a processing circuit 110 and a non-transitory computer-readable medium (or media) 120. In an embodiment, the processing circuit 110 includes one or more processors, one or more processing cores, a programmable logic controller ("PLC"), an application specific integrated circuit ("ASIC"), a programmable gate array ("PGA"), a field programmable gate array ("FPGA"), any combination thereof, or any other processing circuit. In an embodiment, the non-transitory computer-readable medium 120 may be a storage device, such as an electronic storage device, a magnetic storage device, an optical storage device, an electromagnetic storage device, a semiconductor storage device, or any suitable combination thereof, for example, such as a computer diskette, a hard disk, a solid state drive (SSD), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, any combination thereof, or any other storage device. In some instances, the non-transitory computer-readable medium may include multiple storage devices. In certain cases, the non-transitory computer-readable medium 120 is configured to store spatial structure data received from the spatial structure sensing device 151. In certain cases, the non-transitory computer-readable medium 120 further stores computer readable program instructions that, when executed by the processing circuit 110, causes the processing circuit 110 to perform one or more methodologies described here, such as the operation described with respect to FIG. 3.

Figure 2B:
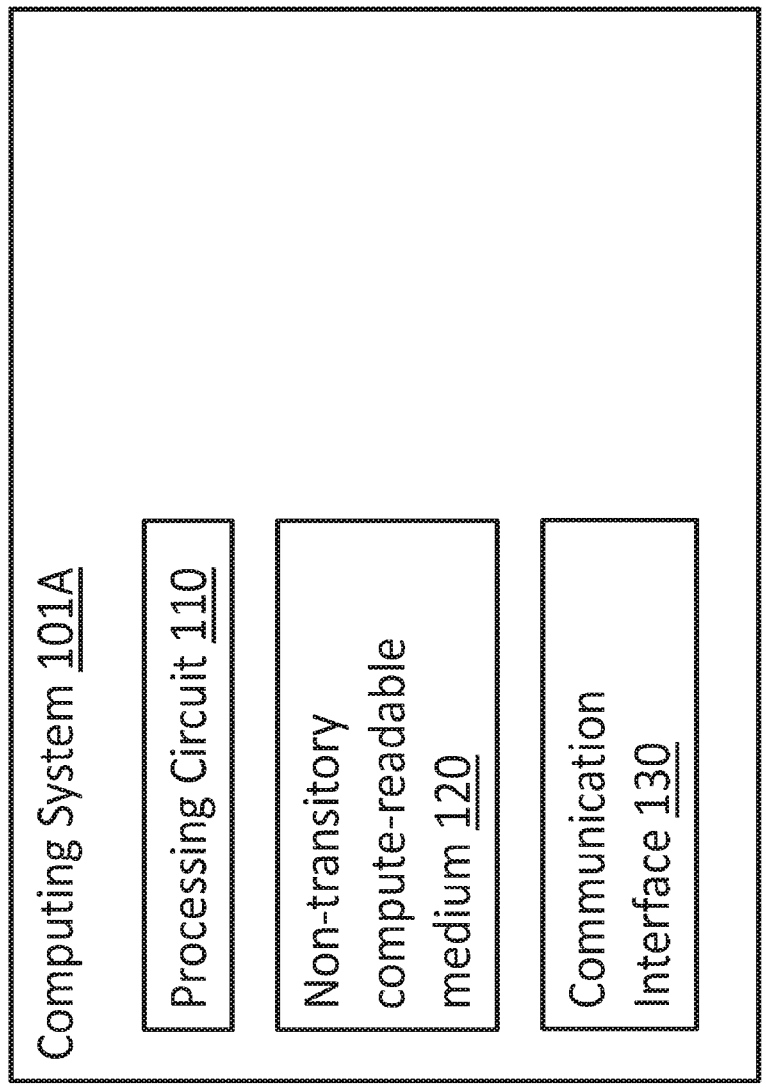

FIG. 2B depicts a computing system 101A that is an embodiment of the computing system 101 and includes a communication interface 130. The communication interface 130 may be configured to, e.g., receive spatial structure data from the spatial structure sensing device 151, such as via the storage device 198 of FIG. 1B, the network 199 of FIG. 1C, or via a more direct connection. In an embodiment, the communication interface 130 may be configured to communicate with the robot 161 of FIG. 1E or the robot control system 162 of FIG. 1F. The communication interface 130 may include, e.g., a communication circuit configured to perform communication over a wired or wireless protocol. As an example, the communication circuit may include a RS-232 port controller, a USB controller, an Ethernet controller, a Bluetooth® controller, a PCI bus controller, any other communication circuit, or a combination thereof.

Figure 2C:
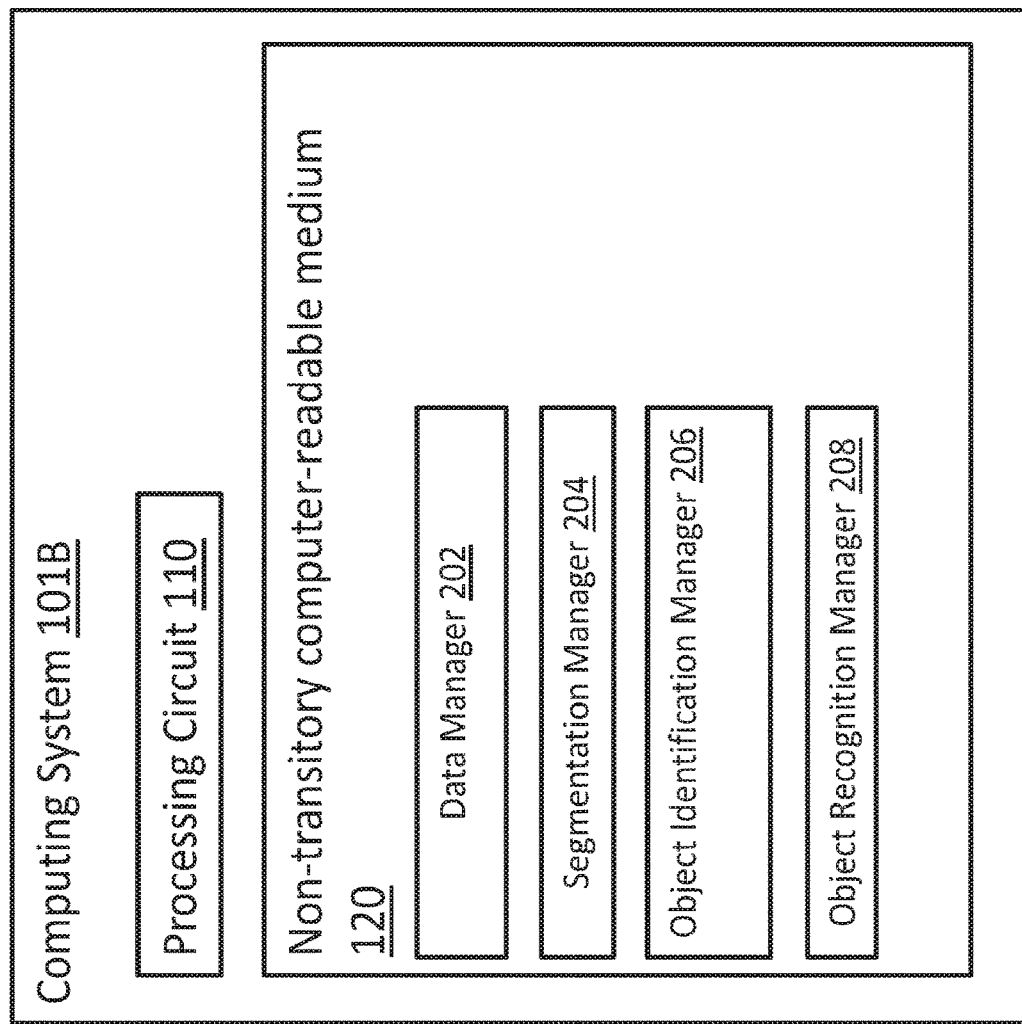

In an embodiment, the processing circuit 110 may be programmed by one or more computer-readable program instructions stored on the storage device 120. For example, FIG. 2C illustrates a computing system 101B, which is an embodiment of the computing system 101, in which the processing circuit 110 is programmed by a data manager 202, a segmentation manager 204, an object identification manager 206, and an object recognition manager 208. It will be understood that the functionality of the various managers as discussed herein is representative and not limiting.

In various embodiments, the terms "software protocol," "software instructions," "computer instructions," "computer-readable instructions," and "computer-readable program instructions" are used to describe software instructions or computer code configured to carry out various tasks and operations. As used herein, the term "manager" refers broadly to a collection of software instructions or code configured to cause the processing circuit 110 to perform one or more functional tasks. For convenience, the various managers, computer instructions, and software protocols will be described as performing various operations or tasks, when, in fact, the managers, computer instructions, and software protocols program hardware processors to perform the operations and tasks. Although described in various places as "software" it is understood that the functionality performed by the "managers," "software protocols," and "computer instructions," may more generally be implemented as firmware, software, hardware, or any combination thereof. Furthermore, embodiments herein are described in terms of method steps, functional steps, and other types of occurrences. In an embodiment, these actions occur according to computer instructions or software protocols executed by processing circuit 110.

In an embodiment, the data manager 202 is a software protocol operating on the computing system 101. The data manager 202 is configured to access (e.g., receive, retrieve, store) spatial structure data, and perform any other suitable operation related to spatial structure data being received or processed (e.g., analyzed) by the computing system 101. For example, the data manager 202 may be configured to access spatial structure data stored in non-transitory computer-readable medium 120 or 198, or via the network 199 and/or the communication interface 130 of FIG. 2B. The data manager 202 may also be configured to interact with other devices through the network 199, with the data storage unit 198, with the non-transitory computer-readable medium 120, and/or with the spatial structure sensing device 151 to request, retrieve, access, send, store, or otherwise perform operations with the spatial structure data.

In embodiments, the data manager 202 is further configured to provide access tools to a user to manage and manipulate spatial structure data. For example, the data manager 202 may be configured to generate and/or provide access to databases, tables, file repositories, and other data storage structures. In embodiments, the data manager 202 may provide data retention capabilities. The data manager 202 is configured to access storage device 120, data storage unit 198, and other memory units to archive, store, and/or otherwise retain spatial structure data and any other data generated during processes of computer system 101.

In an embodiment, the segmentation manager 204 is a software protocol operating on control system 101. The segmentation manager 204 is configured to segment or extract portions of the spatial structure data. For instance, the segmentation manager 204 may be configured to extract a portion of the spatial structure data that represents a layer of object structure, as discussed below in more detail. Such a portion of the spatial structure data may represent or be referred to as a spatial segment.

In an embodiment, the object identification manager 206 is a software protocol operating on control system 101. The object identification manager 206 is configured to receive or access one or more spatial segments generated by the segmentation manager 204 and provide further processing. For instance, the object identification manager 206 may be configured to identify vertices of a layer of the object structure, and to identify convex corners based on the vertices, as discussed below in more detail.

In an embodiment, the object recognition manger 208 is a software protocol operating on the computing system 101. The object recognition manager 208 may be configured to perform object recognition according to the detected convex corners. For example, the object recognition manager 208 may employ the convex corners to generate, modify, and/or filter detection hypotheses, as discussed below in more detail.

Figure 3:
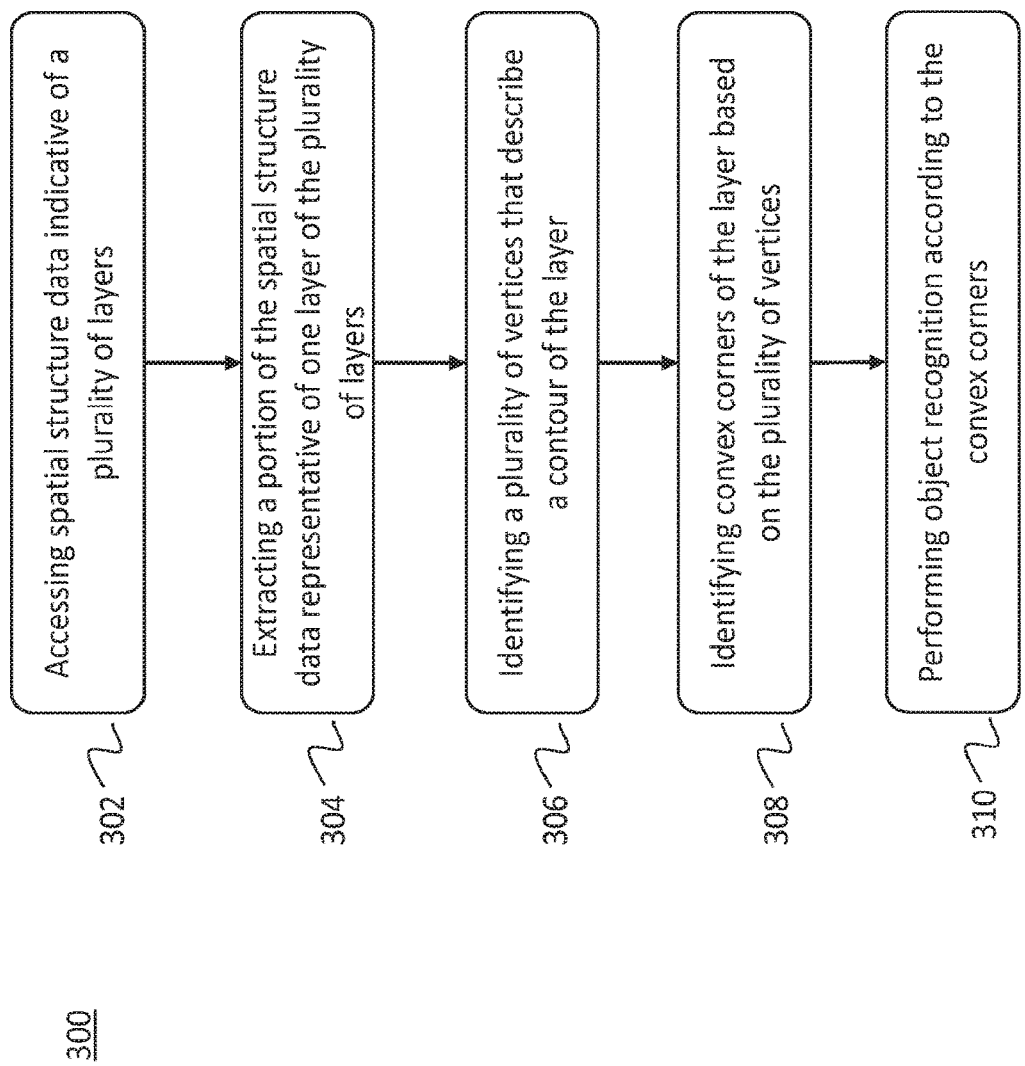
FIG. 3 provides a flow diagram that illustrates a method of processing spatial structure data, according to an embodiment hereof.
Figure 4A:
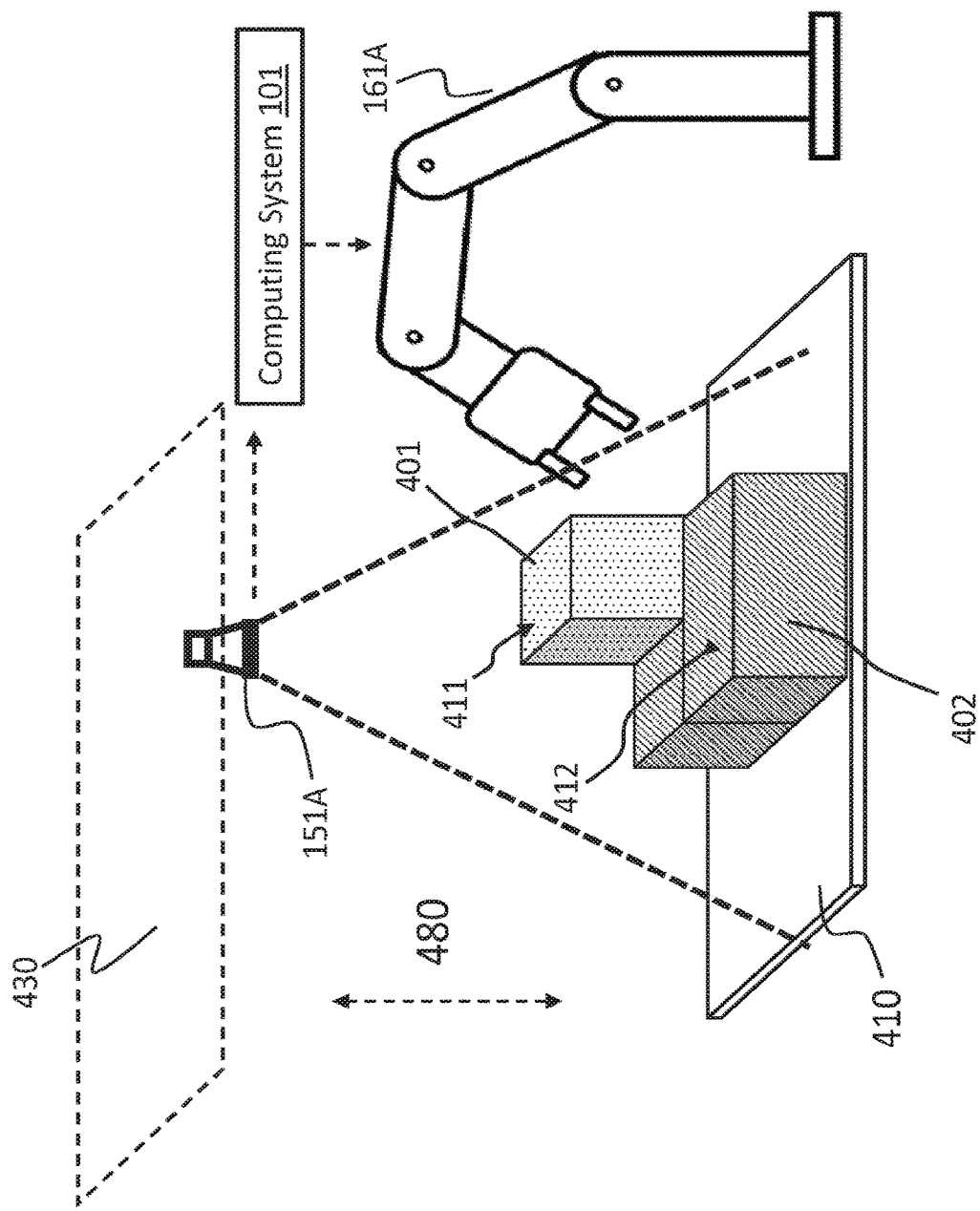
FIGS. 4A-4E illustrate aspects of the operation of a computing system consistent with embodiments hereof.
Figure 4B:
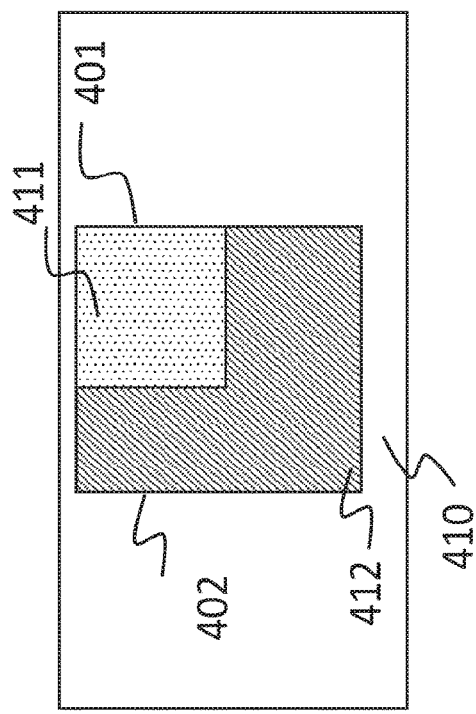

FIG. 3 is a flow chart that illustrates example operations for a method 300 for processing spatial structure data. In one example, method 300 may be part of a de-palletizing procedure in which a stack of objects (e.g., boxes or other packages) are unloaded. For instance, FIG. 4A illustrates an embodiment in which spatial structure data is generated for a series of objects 401, 402. The objects 401, 402 may be, e.g., a stack of boxes or other packages to be unloaded from the stack by a robot 161A (which may be an embodiment of the robot 161 of FIGS. 1E and 1D). The spatial structure data may describe a structure of the objects 401, 402 (which may be referred to as object structure of the objects 401, 402). In the example of FIG. 4A, a top surface 411 of the object 401 may form a first layer of the object structure, and a top surface 412 of the object 402 may form a second layer of the object structure. FIG. 4B illustrates the objects 401, 402 from the vantage point of the spatial structure sensing device 151A of FIG. 4A, which may be disposed directly above the objects 401, 402. From this vantage point, only the top surfaces 411 and 412 of objects 401 and 402, respectively, are visible to the spatial structure sensing device 151A. The surfaces 411 and 412 are parallel to a platform 410, and are perpendicular to a depth dimension, which may be a dimension orthogonal to the platform 410, and parallel with axis 480. As discussed below in more detail with respect to FIG. 4C, the spatial structure data generated by the spatial structure sensing device 151A may indicate that the top surfaces 411 and 412 are at different depths relative to the spatial structure sensing device 151A (as measured along the axis 480 of FIG. 4A) and at different heights relative to the platform 410.

In an embodiment, the method 300 of FIG. 3 may be performed by the computing system 101 of FIGS. 2A through 2C, and more specifically by the processing circuit 110, when spatial structure data describing object structure is stored in the non-transitory computer-readable medium (e.g., 120) of the computing system 101. In an embodiment, the non-transitory computer-readable medium 120 of FIGS. 2A through 2C may further store a plurality of instructions (e.g., computer program instructions) that, when executed by the processing circuit 110, causes the processing circuit 110 to execute the method 300. In an embodiment, the method 300 may involve identifying convex corners from spatial structure data and using the convex corners for a subsequent (or contemporaneous) object recognition operation.

In an embodiment, method 300 of FIG. 3 includes an operation 302, in which the processing circuit 110 of the computing system 101 (of FIGS. 2A-2C) accesses spatial structure data, which describes object structure. In some cases, operation 302 may be performed by the data manger 202 of FIG. 2C. In an embodiment, accessing the spatial structure data may involve retrieving (or, more generally, receiving) the spatial structure data from the non-transitory computer-readable medium 120 or from any other device. In some situations, the spatial structure data may have been received by the computing system 101 from the spatial structure sensing device 151, such as via the communication interface 130 of FIG. 2B, and may have been stored in the non-transitory computer-readable medium 120, which may provide a temporary buffer or long-term storage for the spatial structure data. For instance, the spatial structure data may include a point cloud received from the spatial structure sensing device 151 and stored in the non-transitory computer-readable medium 120. The point cloud may then be accessed in by the processing circuit 110 in operation 302.

In some situations, the spatial structure data that is accessed may be stored in the non-transitory computer-readable medium 120 and may have been generated beforehand by the processing circuit 110 itself based on information received from the spatial structure sensing device 151. For instance, the processing circuit 110 may be configured to generate a point cloud based on raw sensor data received from the spatial structure sensing device 151 and may be configured to store the generated point cloud in the non-transitory computer-readable medium 120. The point cloud may then be accessed by the processing circuit 110 in operation 302 (e.g., by retrieving the data from the non-transitory computer-readable medium 120).

As stated above, the spatial structure data may describe a structure of one or more objects, such as the objects 401, 402 in FIG. 4A. In an embodiment, the spatial structure data may include a depth map, which may have a plurality of pixels [u, v], some or all of which may have a depth value. Each of the pixels in the depth map may correspond to a respective physical location captured or otherwise represented by the pixel, and the depth value may indicate a distance from the spatial structure sensing device (e.g., 151A of FIG. 4A) and that physical location. The physical location may be on, e.g., a surface of the objects 401, 402, or a surface of the platform 410 on which the objects 401, 402 are located. In some cases, the distance may be measured along the axis 480 that is orthogonal to an imaginary plane 430 at which the spatial structure sensing device 151A is located. In some cases, the depth value assigned to a pixel [u, v] may represent a Z-component of coordinate of the corresponding physical location. For instance, the spatial structure sensing device 151A may be a depth-sensing camera. In such an instance, a particular pixel [u, v] in the depth map may correspond to a physical location on a surface of the objects 401, 402 or of the platform 410, wherein the physical location has a coordinate [X, Y, Z] whose X-component and Y-component are based on an inverse projection matrix of the depth-sensing camera, and whose Z-component is equal to or otherwise based on the depth value assigned to the pixel [u v] (the coordinate [X Y Z] may be in a coordinate system of the depth-sensing camera).

In an embodiment, the spatial structure data may include a point cloud. As stated above, the point cloud may include a plurality of coordinates that identify a plurality of points that are physical locations on object structure, such as physical locations on one or more surfaces of the objects 401, 402 of FIG. 4A. In an embodiment, if the spatial structure data includes the point cloud, it may in some scenarios be generated (e.g., by the spatial structure sensing device 151 or computing system 101) based on the depth map discussed above.

Figure 4C:
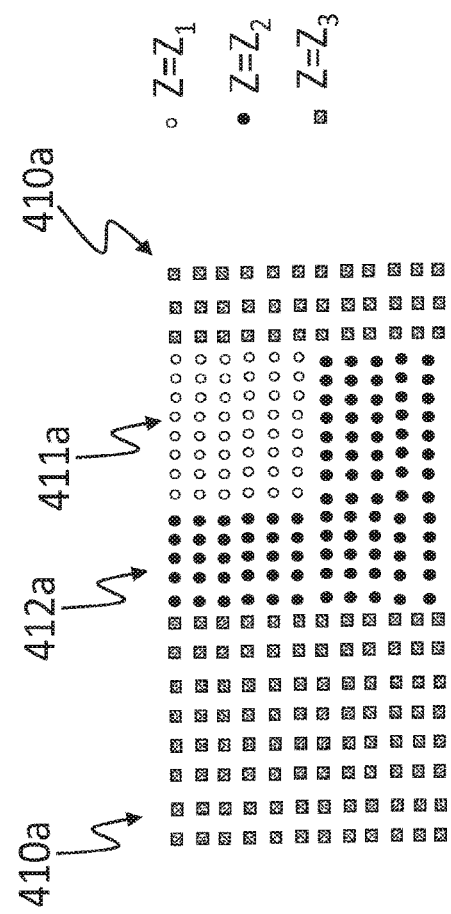

FIG. 4C illustrates an example of a point cloud that represents object structure for the objects 401, 402 of FIG. 4A. More specifically, the figure illustrates a plurality of points represented by the point cloud. The plurality of points may be physical locations on one or more surfaces of the objects 401, 402. The point cloud may include a respective coordinate (e.g., [X Y Z] coordinate) for each of the plurality of points. The density of the physical points that are represented by the point cloud may be greater or less than what is illustrated in FIG. 4C, depending on a resolution of the spatial structure sensing device 151/151A. The Z-component of the coordinate of a particular point may represent a depth value of that point. In the example of FIG. 4C, the point cloud may identify a depth value of $Z=Z_1$ (e.g., 150 cm) for physical points on the top surface 411 of FIG. 4A of the object 401, identify a depth value of $Z=Z_2$ (e.g., 200 cm) for physical points on the surface 412 of FIG. 4A of the object 402, and identify a depth value of $Z=Z_3$ (e.g., 260 cm) for physical points on the surface of the platform 410 of FIG. 4A.

In an embodiment, the spatial structure data may have depth information indicative of a plurality of layers of a structure of one or more objects (e.g., 401, 402). In some cases, each layer may indicate or include points (e.g., physical locations) on the structure that have the same depth value or substantially the same depth value, or indicate points on the structure that change in depth value by a gradual amount and/or in a smooth, continuous manner (as opposed to a sharp or abrupt manner). For instance, FIG. 4C relates to a point cloud that identifies a first set of points 411a that represents the top surface 411 of the object 401, identifies a second set of points 412a that represents the top surface 412 of the object 402, and identifies a third set of points 410a that represents the top surface of the platform 410. In this example, the first set of points 411a have the same depth value of $Z_1$, and thus may represents a first layer of the object structure. Similarly, the second set of points 412a may all have the same depth value of $Z_2$, while the third set of points 410a may all have the same depth value of $Z_3$, and thus the second set of points 412a and the third set of points 410a may represent a second layer and a third layer, respectively, of the object structure for the one or more objects 402 and the platform 410. As stated above, each layer may correspond to a different surface of the object structure. For instance, the first layer may correspond to the top surface 411 of FIG. 4A, and the second layer may correspond to the top surface 412. In some cases, the layers may correspond to only surfaces that are parallel to an image plane of the spatial structure sensing device 130, such as the imaginary plane 430.

In an embodiment, points that are represented by a point cloud (or other form of spatial structure data) may be divided into different layers based on a sharp change in depth value. A change may be considered sharp if, e.g., it has an absolute value or a rate of change that exceeds a defined threshold. For instance, the points represented by the point cloud for FIG. 4C includes a change of $Z_2-Z_1$ (e.g., 50 cm) between the first set points 411a and the second set of points 412a, and includes a change of $Z_3-Z_2$ (e.g., 60 cm) between the second set of points 412a and the third set of points 410a, and more specifically between neighboring points. Such changes may exceed a defined threshold (e.g., 0.5 cm or 1 cm), and thus may be considered a sharp change. Because of the sharp change, the first set of points 411a, second set of points 412a, and the third set of points 410a may be considered to be on different layers of the object structure.

Referring back to FIG. 3, the method 300 may further include an operation 304 in which the processing circuit 101 of the computing system 101 extracts, from the spatial structure data, a portion of the spatial structure data representative of one layer of the plurality of layers (the portion may also be referred to as a spatial segment). In an embodiment, operation 304 may be performed by the segmentation manager 204. If the spatial structure data captures an image of the one or more objects, such as a grayscale image or color image, the portion that is extracted from the spatial structure data may also be referred to as an image segment. In some implementations, the portion that is extracted may represent only one layer of the plurality of layers of the object structure.

Figure 4D:
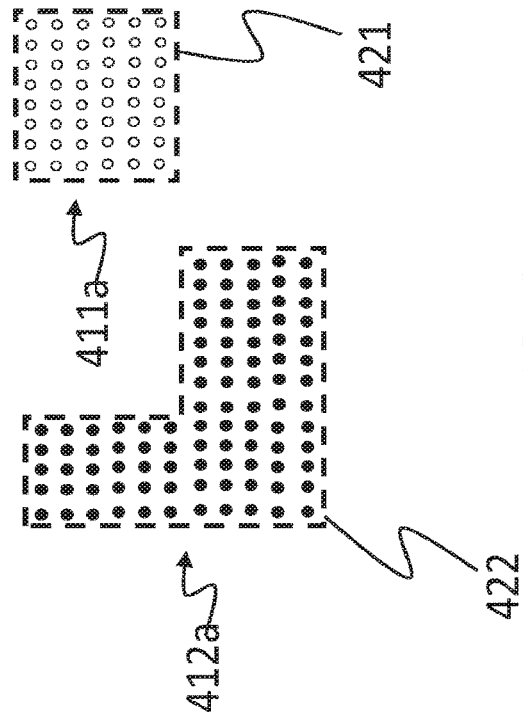
Figure 4E:
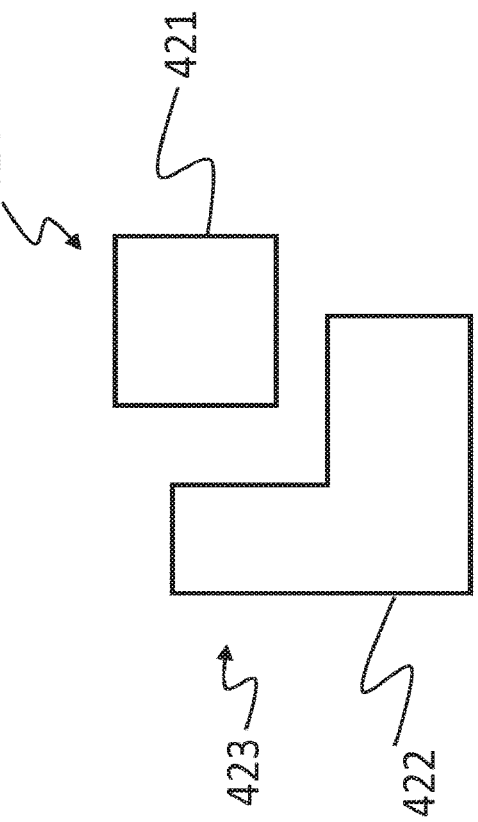

FIG. 4D depicts an example in which operation 304 extracts, from the point cloud or other spatial structure data, a first portion that represents a first layer 421 of the object structure and extracts a second portion that represents a second layer 422 of the object structure. The first portion may include the first set of points 411a, or more specifically a first set of coordinates representing those points. The second portion may include the second of points 412a, and more specifically a second set of coordinates that represent the second set of points 412a. FIG. 4E also illustrates the first layer 421 and the second layer 422 that are extracted, and further illustrates a contour 423 of the first layer 421 and a contour 424 of the second layer 422. Thus, in an embodiment, the spatial structure data comprises a point cloud that identifies a plurality of points which are respective locations on one or more surfaces of the object structure, and the portion of the spatial structure data that is extracted identifies a set of points which are representative of a particular layer.

In an embodiment, operation 304 may involve extracting, from the spatial structure data, data values (e.g., coordinates) that identify a set of points that have the same depth value, or whose depth values are within a defined range. For instance, operation 304 for the example of FIGS. 4C and 4D may involve identifying the first set of points 411a from the spatial structure data in that example, because the first set of points 411a have the same depth value. Similarly, operation 304 may alternatively or additionally involve identifying the second set of points 412a from the spatial structure data because the second set of points 412a have the same depth value.

In an embodiment, the portion that is extracted in operation 304 (which may be referred to as a spatial segment) may represent a portion of the spatial structure data that has depth values which fall within a defined range corresponding to one layer of the plurality of layers. When operation 304 is complete, each spatial segment may represent a different layer of the plurality of layers. In an embodiment, all or some of the total plurality of layers may be represented by the spatial segments. In an embodiment, some layers of a structure of the one or more objects may have no corresponding surfaces at the appropriate depth and therefore have no corresponding spatial segments. The number of spatial segments extracted in operation 304 (e.g., by the segmentation manager 204) in further examples will correspond to the number of detected layers represented by the spatial structure data.

In an embodiment, operation 304 may involve the computing system 101 dividing the spatial structure data into portions or segments that represent different levels of the object structure, or that represents surfaces of different respective depths for that object structure. In some cases, dividing the spatial structure data may be based on identifying respective portions of the spatial structure data that have different depth values. In some cases, dividing the spatial structure data may be based on detecting a sharp change in depth value among portions of the spatial structure data. For instance, performing operation 304 for FIG. 4D may involve detecting a sharp change in depth value between two sets of points of the spatial structure data of this example, from a depth value of $Z_1$ to a value of $Z_2$. The two sets may be identified as the first set of points 411a and the second set of points 412a.

In an embodiment, operation 304 may accommodate one or more objects that have a structure with an angled surface. The angled surface may be, e.g., a surface which is not parallel with the spatial structure sensing device 151/151A, and more specifically is not parallel with an image plane thereof, e.g., imaginary plane 430 of FIG. 4A. The angled surface may thus have different depth values, relative to the spatial structure sensing device 151/151A, across the surface. In embodiments, layers may be selected to accommodate such angled surfaces. For instance, a layer may be selected for spatial segmentation that includes the entirety of the angled surface. Thus, the layer in the spatial structure data may be selected specifically to ensure that the angled surface is contained by a single spatial segment.

As stated above, the portion of the spatial structure data being extracted in operation 304 may also be referred to as a spatial segment. In an embodiment, the spatial segments being extracted may be stored (e.g., by the segmentation manager 204) as masks. Each mask may include information specifying one or more regions that is part of a respective layer of the object structure of the one or more objects and may exclude all regions that is not part of the respective layer of the object structure. In other words, the mask may include information specifying one or more regions that is part of the structure at a given depth and may exclude all regions that is not part of the structure at the given depth. Each spatial segment may be stored in, e.g., the data storage device 198 of FIG. 1B or other non-transitory computer-readable storage medium. In an embodiment, the spatial segment may be received for further processing by the object identification manager 206 of FIG. 2C, either directly from the segmentation manager 204 or via the data storage device 198 or non-transitory computer-readable medium 120 of FIG. 2A.

Figure 5A:
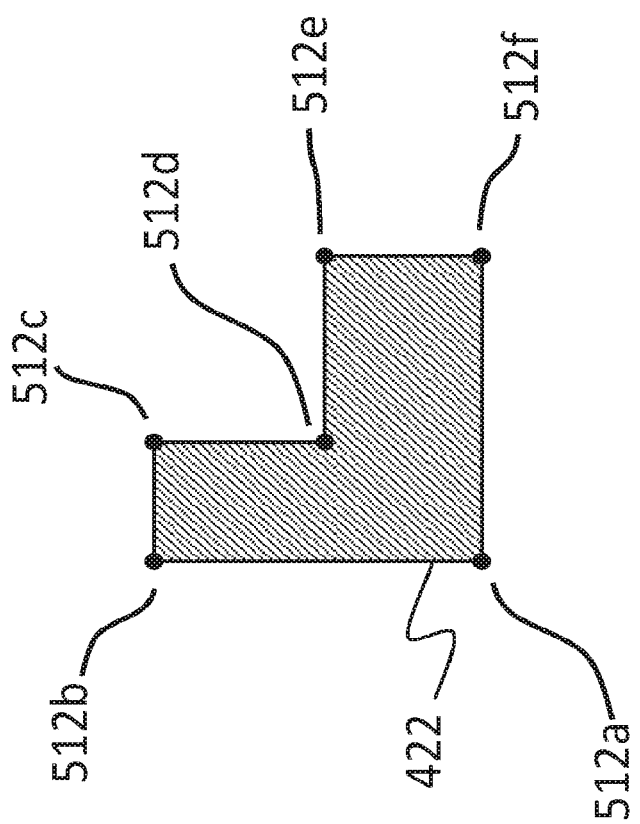
FIGS. 5A-5G illustrate aspects of the operation of a computing system consistent with embodiments hereof.

Returning to FIG. 3, the method 300 may include an operation 306, in which the processing circuit 110 of the computing system 101 identifies, from the portion of the spatial structure data extracted in operation 304, a plurality of vertices (also referred to as contour points) that describe a contour of the layer discussed with respect to operation 304. For instance, FIG. 5A illustrates a plurality of vertices 512a-512f that are extracted for the layer 422. In an embodiment, operation 306 may be performed by the object identification manager 506.

Figure 5B:
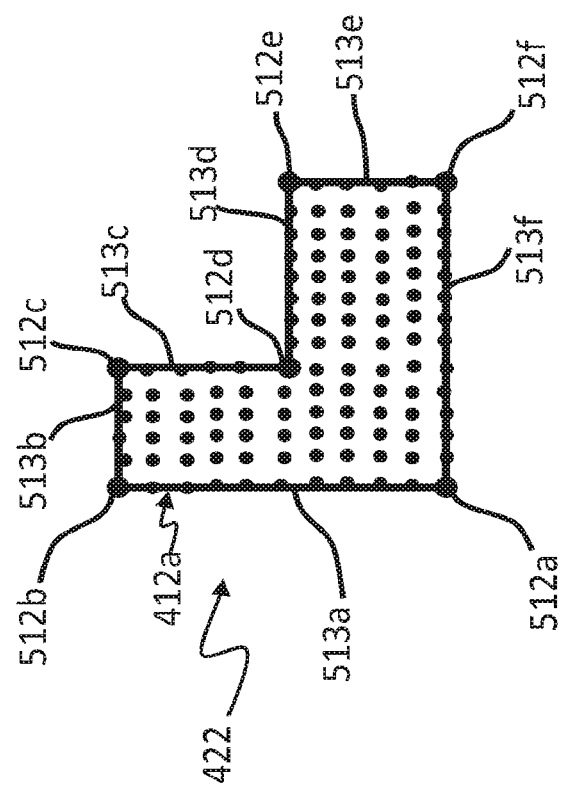

As discussed above, in some cases the spatial structure data comprises a point cloud that identifies points on a surface of an object structure. The portion extracted from the point cloud that is representative of the layer in operation 304 may identify a set of points (e.g., points 412a of FIG. 4D) that are extracted from the plurality of points identified by the point cloud. In such cases, the processing circuit 110 may perform operation 306 by, e.g., identifying a plurality of line segments that form edges (e.g., straight edges) of the set of points representing the layer (e.g., 422), and identifying the plurality of vertices of operation 306 as endpoints of the line segments. For instance, FIG. 5B depicts a plurality of line segments 513a-513f that form straight edges of the set of points 412a. Each of the line segments may be a line that has two opposite ends defined by two respective endpoints. For instance, line segment 513a has two opposite ends defined by endpoint 512a and 512b, which may be identified as two vertices in operation 306. In some cases, a particular line segment may be considered an edge if it extends through edge points of the set of points 412a, as illustrated in FIG. 5B. The edge points of a set of points (e.g., of set 412a) may be those points that are on a periphery of the set of points. More generally, the edge points may be points that represent one or more outer edges of a particular layer. In some cases, a particular line segment may be near the edge points and may be considered an edge even if some points of the set of points extend slightly past that line segment. In some cases, a particular line segment may be considered an edge only if no points of the set of points extend past that line segment.

Figure 5C:
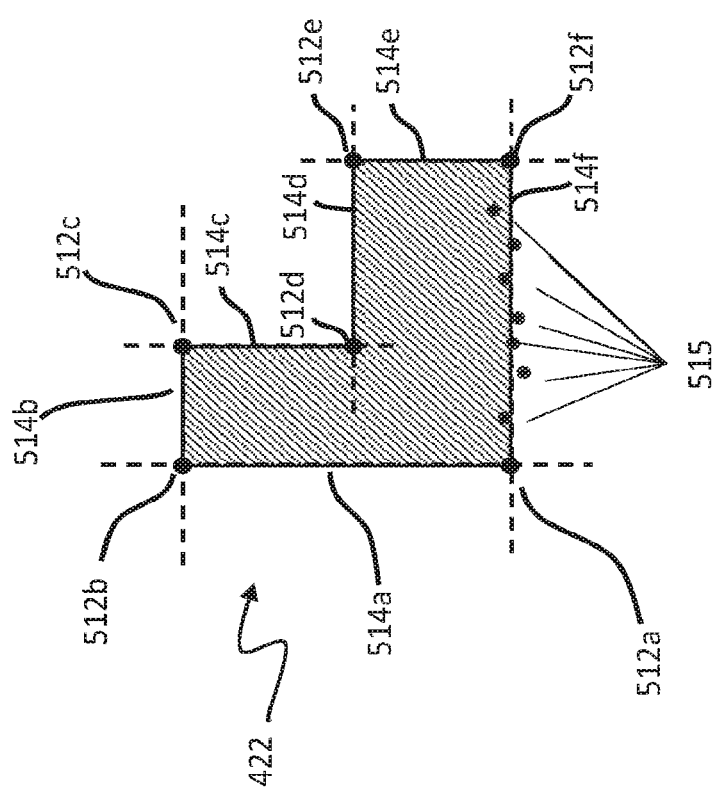

In some cases, the processing circuit 110 may perform operation 306 by extracting (or, more generally, identifying) a plurality of edge points from among the set of points (e.g., 412a), and determining a plurality of lines that fit through the plurality of edge points. In such cases, the processing circuit 110 may identify, as the plurality of vertices, intersection points at which the plurality of lines intersect. For instance, FIG. 5C illustrates a plurality of lines 514a-514e that fit through a plurality of edge points of the portion of spatial structure data extracted from operation 304. As an example, the line 514f may be a line that is fitted so as to approximate a contour of the edge points 515 in FIG. 5C. The figure illustrates only a portion of the edge points of the layer 422, which surround an entire contour of the layer. FIG. 5C further depicts the plurality of vertices 512a-512f as points of intersection between the lines 514a-514e. For instance, the vertex 512a may be an intersection point between the line 514a and the line 515f. The plurality of vertices identified in operation 306 (e.g., 512a-512f) may include all of the points of intersections between the lines discussed above (e.g., lines 514a-514f), or only a subset of the points of intersection.

In an embodiment, the edge points 515 represented by the captured spatial structure data may not line up in a straight line. In such an embodiment, operation 306 may involve (e.g., via object identification manager 206) fitting the set of lines 514a-514f in a manner that best approximates respective locations of the edge points. The process of fitting the set of lines may use any suitable algorithm to fit lines 514a-514f to edge points 515, including, for example, least squares analysis and others. After generating the lines 514a-514f, the plurality of vertices 512a-512f may be identified according to the intersections of the lines 514a-514f. Each or some of the intersection points where two or more of the lines 514a-514f intersect may be defined or otherwise identified as one of the vertices 512a-512f of the layer 422. Thus, the plurality of vertices 512a-512f may define a contour of the layer. In an embodiment, the plurality of vertices which are identified using the technique illustrated in FIG. 5B may be the same as the plurality of vertices which are identified using the technique illustrated in FIG. 5C.

Returning to FIG. 3, method 300 may include an operation 308, in which the processing circuit 110 of the computing system 110 identifies convex corners of the layer based on the plurality of vertices. In an embodiment, operation 308 may be performed by the object identification manager 206. The convex corners may be or represent, e.g., physical locations on the object structure from which it is more convenient, more efficient, or more effective to perform object recognition, or physical locations at which interaction between the one or more objects and the robot (e.g., 161 of FIG. 1F) may be convenient. In some scenarios, if an object structure includes a box or other rectangular prism, the convex corners may include, e.g., some of or all outside corners of the rectangular prism, and in some scenarios, the convex corners may include or represent only those locations. In some scenarios, a convex corner of an object structure may be an exterior corner for which a plane can be drawn that intersects the object structure at only that corner. As discussed below in more detail, some embodiments of identifying the convex corners may involve identifying 3D corners that are convex. The 3D corners may be 3D vertices that satisfy an orthogonality criterion, as discussed below in more detail. The 3D vertices may be vertices that satisfy a first length criterion and/or a second length criterion, as also discussed below in more detail. The first length criterion, the second length criterion, and the orthogonality criterion may more generally be referred to as a first criterion, a second criterion, and a third criterion, respectively. In some embodiments, identifying the convex corners may involve determining or otherwise identifying one or more fusion corners, which are also discussed below in more detail.

In an embodiment, operation 308 may involve determining a relationship that is indicative of at least a distance or distances between two or more vertices from among the plurality of vertices (such as those identified from operation 306). The operation may further involve identifying a subset of the plurality of vertices as 3D corners according to the relationship, and identifying, as the convex corners, 3D corners that are convex. In some cases, the relationship is further indicative of respective angles formed by pairs of vectors, wherein each of the vectors extend between a pair of vertices of the plurality of vertices.

In an embodiment, the 3D corners may be 3D vertices that satisfy an orthogonality criterion, as discussed below in more detail. Operation 308 may involve identifying a set of 3D vertices based on the relationship between the vertices. A 3D vertex may generally be a vertex that has a low likelihood of being an artifact. More specifically, noise, interference, or other sources of error may introduce an artifact in the spatial structure data accessed in operation 302. A vertex that is an artifact of the spatial structure data refers to a portion of the spatial structure data that does not represent a physical vertex on the object structure. Such a vertex may be excluded from the set of 3D vertices. In some cases, the set of 3D corners are identified from among the set of 3D vertices, and at least some of the convex corners may be identified from among the 3D corners, as discussed below in more detail.

The set of 3D vertices may, in some implementations, include vertices that each has a respective distance to a neighboring vertex which is equal to or exceeds a defined length threshold (also referred to as a threshold length). The set of 3D vertices may further exclude any vertex that has a respective distance to a neighboring vertex which is less than the defined length threshold. In other words, because the spatial structure data is based on sensor data and is therefore subject to noise, error, artifacts, and other imperfections, the plurality of identified vertices may not represent the corners or other physical features of the structure of the one or more objects with complete accuracy. For example, an object may have a structure that is a rectangular prism (also referred to as a rectangular box) with four vertices on one layer of that structure, but the spatial structure data for the structure of that object may indicate that the layer has seven vertices. Thus, an operation may be performed to distinguish 3D vertices of the spatial structure data, which are vertices that have a low likelihood of being an artifact, from vertices that are likely to be artifacts in the spatial structure data.

In some cases, this operation is performed based on one or more length criteria. The one or more length criteria may evaluate whether a distance from a particular vertex to a neighboring vertex (e.g., a nearest neighboring vertex) exceeds a defined threshold. For instance, if two vertices are too close together (e.g., based on the threshold length and/or length criteria) in the spatial structure data, one of the vertices may be an artifact, because noise or interference which cause the artifact may be localized within the spatial structure data, and thus any feature which is an artifact or that appears as a result of the artifact may be small in size relative to actual physical features of the object structure. Thus, as discussed below in more detail, one or more length criteria may be used to identify which vertices should be included as a 3D vertex in a set of 3D vertices. Further, the set of 3D corners may include 3D vertices, from among the set of 3D vertices, that represent an orthogonal corner of the object structure.

In an embodiment, operation 308 involves determining (e.g., by the object identification manager 206) whether each vertex of the plurality of vertices (of operation 306) is a 3D corner, based on the length criteria and/or orthogonality criterion discussed above. Such a determination may further involve determining, for each vertex of the plurality of vertices, a relationship between that vertex and at least one other vertex from the plurality of vertices, or relationship between that vertex and two other vertices (e.g., two nearest neighboring vertices).

In an embodiment, identifying 3D corners as part of operation 308 may involve determining whether to include a first vertex of the plurality of vertices into a set of 3D corners. As an example, the first vertex may be vertex 512b in FIG. 5D. In some cases, operation 308 may involve multiple iterations that evaluate all of the plurality of vertices to determine whether they are 3D vertices and/or to determine whether they are 3D corners, and the first vertex may be, e.g., part of one of the iterations. The iterations may, e.g., progress through the plurality of vertices in a sequence that follows the contour 423 of the layer 422 in a clockwise manner or a counterclockwise manner. In such cases, the first vertex may be a current vertex or a current contour point (which may be referred to as cVx or cPt) for that particular iteration.

The above determination of whether the first vertex is a 3D corner may involve selecting (e.g., by the object identification manager 206), from among the plurality of vertices, a second vertex that is a nearest neighboring vertex to the first vertex in a first direction along the contour of the layer. For instance, the second vertex may be vertex 512a, which is a nearest neighboring vertex (also referred to as a closest neighboring vertex) to the vertex 512b in a first direction A (e.g., a counterclockwise direction as illustrated by the dashed arrow) along the contour 423 of the layer 422. As stated above, operation 308 may involve multiple iterations that progress through the plurality of vertices identified in operation 306 (e.g., in a clockwise manner) so as to evaluate each vertex of the plurality of vertices to determine whether the vertex is a 3D vertex and/or to determine whether the vertex is a 3D corner. In this example, the second vertex may be a previous vertex or previous contour point (which is referred to as pVx or pPt). The previous vertex may be a vertex that was evaluated in a previous iteration (e.g., a previous consecutive iteration). For instance, if a current iteration is evaluating vertex 512b to determine whether it is a 3D corner, then vertex 512b may be the current vertex, and vertex 512a may be a previous vertex. Further, vertex 512c in this example may be a next vertex. The next vertex or next contour point may be a vertex that will be evaluated in the next consecutive iteration to determine whether that vertex is a 3D vertex and/or to determine whether that vertex is a 3D corner (which may be referred to as nVx or nPt).

The above embodiment of determining whether the first vertex is a 3D corner may further involve defining a first vector that is from the first vertex to the second vertex (and thus points away from the first vertex). For example, the first vector may be the vector 551 in FIG. 5D. The first vector 551 of FIG. 5D may, in some cases, be a version of the line segment 513a of FIG. 5B, in which the line segment has directionality. In some instances, if the first vertex is represented by a first coordinate $[X_1, Y_1, Z_1]$, and the second vertex is represented by a second coordinate $[X_2, Y_2, Z_2]$, the first vector $\vec{v}_1$ may be defined as $\langle X_2-X_1, Y_2-Y_1, Z_2-Z_1 \rangle$. In some cases, the Z-component may be ignored if the vertices have the same Z-component for their respective coordinates. In such cases, the first vector $\vec{v}_1$ may be defined as $\langle X_2-X_1, Y_2-Y_1 \rangle$. In some cases, the first vector is from a current vertex or current contour point (cVx or cPt) to a previous vertex or previous contour point (pVx or pPt).

The above embodiment of determining whether a first vertex is a 3D corner may further involve selecting, from among the plurality of vertices, a third vertex that is a closest neighboring vertex to the first vertex in a second direction along the contour of the layer, wherein the second direction is different from the first direction discussed above. For instance, the third vertex may be vertex 512c in FIG. 5D, which is a closest neighboring vertex to the vertex 512b in a second direction B (e.g., clockwise direction as illustrated by the dashed arrow) along the contour 423 of the layer defined by the portion/spatial segment. The second direction B is different than the first direction A. More specifically, the first direction A of FIG. 5D may be a direction of flow that traces the contour 423 of the layer in the figure in a counterclockwise manner, while the second direction B may be a direction of flow that traces the contour 423 in a clockwise manner. In some cases, the third vertex may be the next vertex or next contour point (referred to as nVx or nPt). Further, a second vector may be determined in this embodiment, wherein the second vector is from the first vertex to the third vertex (and thus also points away from the first vertex). For instance, the second vector may be vector 552 in FIG. 5D, which is from the vertex 512b to the vertex 512c. Similar to the above example, if the third vertex is represented by a third coordinate $[X_3, Y_3, Z_3]$, the second vector $\vec{v}_2$ may be defined as $\langle X_3-X_1, Y_3-Y_1, Z_3-Z_1 \rangle$. In some cases, the second vector may be from the current vertex or current contour point to the next vertex or next contour point.

The above embodiment may further involve determining whether the first vector $\vec{v}_1$ satisfies a first length criterion, and whether the second vector $\vec{v}_2$ satisfies a second length criterion. Such a determination may involve comparing a length of the first vector (which may be referred to as a first length) to a defined threshold length and comparing a length of the second vector (which may be referred to as a second length) to the defined length threshold. The first length may be, e.g., a distance from the vertex 512b to the vertex 512a. In some instances, if the first vector is a vector from a current vertex cVx to a previous vertex pVx, the first length may be defined as Norm(cVx-pVx), wherein "Norm" is a function that determines a Euclidean distance between two points. The second length may be, e.g., a distance from the vertex 512b to the vertex 512c. In some instances, if the second vector is a vector from a current vertex cVx to a next vertex nVx, the second distance may be defined as Norm(cVx-nVx). As stated above, comparing the vectors' lengths to a threshold length ensures that the first vertex (e.g., 512b) is far enough away from the second vertex (e.g., 512a) and the third vertex (e.g., 512c) to determine that the first vertex has a low likelihood of being an artifact. In some cases, the vertex may be considered to be a 3D vertex if it satisfies the first length criterion and the second length criterion. In some cases, a vertex is determined not to be a 3D vertex (and thus not a 3D corner) if it fails to satisfy either of the first and second length criteria, or if it fails to satisfy both the first and second length criteria. If the vertex is determined not to be a 3D vertex, it may be excluded from being used to identify convex corners. For instance, the processing circuit 110 may ignore the vertex when identifying convex corners, which is discussed below in more detail. In some cases, the processing circuit 110 may be configured to remove, from the spatial structure data, data values corresponding to such a vertex which is not a 3D vertex.

The threshold length in the above example may be determined or otherwise defined according to one or more of several techniques. In embodiments, the threshold length may be predetermined by a user, manager, or other operator of the computing system 101 of FIGS. 1A-1C. The threshold length may be predetermined according to knowledge of the objects or type of objects that are being sensed or will be sensed by the spatial structure sensing device 151 of FIGS. 1A-1C. For example, if the objects are known to have edges with a minimum expected length, the threshold length may be selected to eliminate or otherwise filter out vertices of the spatial structure data that form edges which are less than the minimum expected length. In some cases, the threshold length may be determined based on knowledge of the spatial structure sensing device 151 (e.g., knowledge of a level of accuracy for a type of spatial structure sensing device to which device 151 belongs).

Figure 5D:
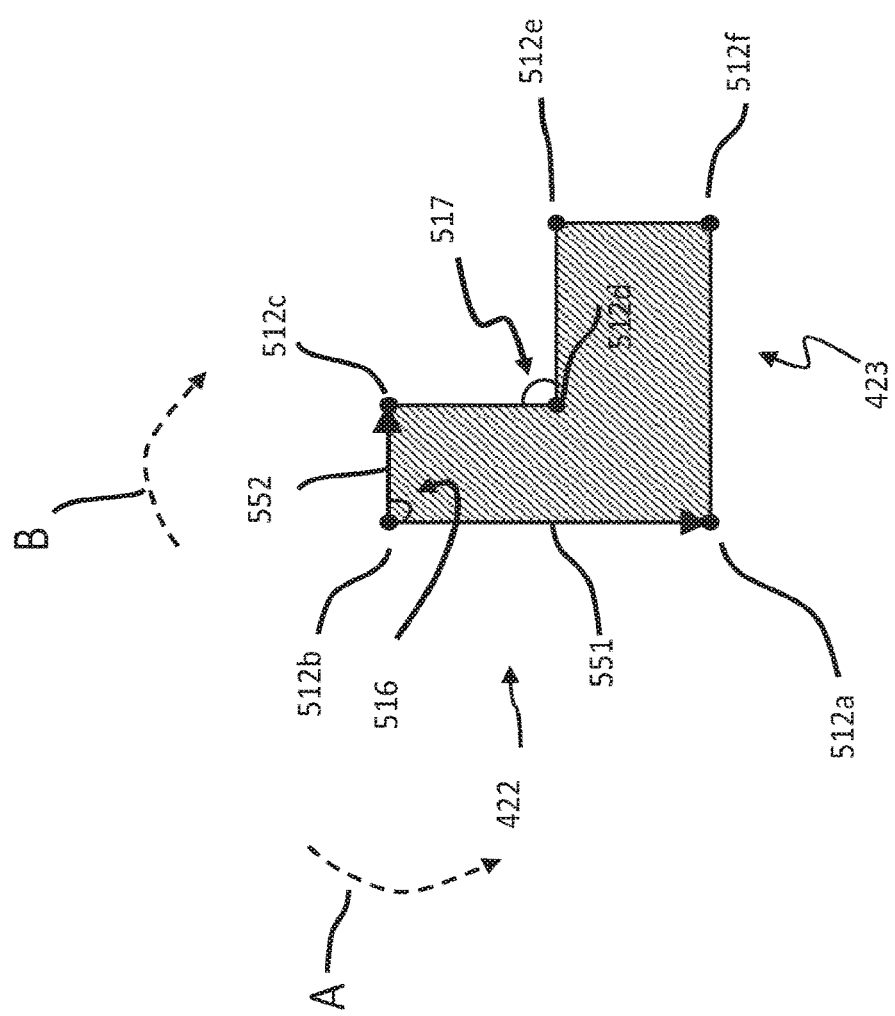
Figure 5E:
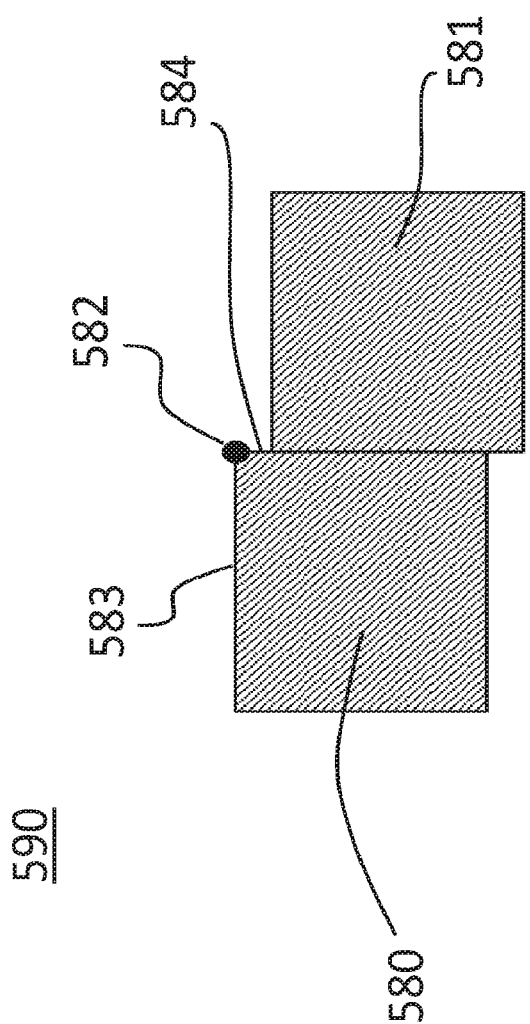

In embodiments, the minimum expected length may be multiplied by a correction factor to arrive at the threshold length. The correction factor may be, e.g., a predetermined scalar value between 0 and 1. The correction factor may be determined according to an amount of noise in the spatial structure data. If the spatial structure data is noisy, the correction factor may be a smaller number. With noisy spatial structure data, it is expected that there will be a greater number of vertices in the spatial structure data that are artifacts. A smaller correction factor lowers the threshold length to account for greater variation and noise in the spatial structure data, so as to filter out more artifacts. If, on the other hand, the spatial structure data is less noisy, the correction factor may be a larger number (i.e., raising the threshold length where there is less variation or noise in the spatial structure data). In embodiments, spatial structure data may be analyzed for noise by the object identification manager 206, which may then select a correction factor according to a measure of the noise in the spatial structure data. In embodiments, the correction factor may be selected or otherwise determined according to an expected arrangement of objects. This feature is illustrated with reference to FIG. 5E, which depicts a layer 590 defined by a portion/spatial segment of spatial structure data which describes a structure of objects 580, 581. The objects 580, 581 may be of the same size, and may be arranged irregularly or offset from one another. For instance, such objects 580, 581 are not aligned with each other. Such objects 580, 581 may be sensed as having a structure with edges of different lengths, due to offsets in the arrangement. More specifically, the objects 580 and 581 are square shaped and are the same size, each with four edges of identical lengths. Accordingly, a minimum expected length may be selected as the length of any one edge, e.g., edge 583 of the object 580. However, FIG. 5E depicts a spatial offset between object 580 and 581, which creates a short edge 584 in the spatial segment 590. If the correction factor is set as a high value (e.g., close to 1), the threshold length will be only slightly shorter than the length of edge 583. Such a high value for the correction factor will thus result in edge 584 failing to meet the first length criterion and second length criterion discussed above, which may cause, e.g., vertex 582 to not be recognized as a 3D vertex, even though vertex 582 is not an artifact. Accordingly, in embodiments, the object identification manager 206 may select a smaller correction factor (e.g., a correction factor with a value that is closer to 0), resulting in a threshold length smaller than the length of the edge 584, such that the vertex 582 does not fail the first and second length criteria.

In an embodiment, the above embodiment of determining whether the first vertex is a 3D corner may further involve determining whether the first vertex satisfies the orthogonality criterion. This may involve determining whether the first vector $\vec{v}_1$ and the second vector $\vec{v}_2$ discussed above are substantially orthogonal to each other. For instance, the orthogonality criterion may involve evaluating whether the vector 551 of FIG. 5D and the vector 552 of FIG. 5D are substantially orthogonal (also referred to as being substantially perpendicular). As used herein, substantially orthogonal refers to two lines or two vectors that meet at an angle that is approximately 90°. Approximately 90° may include a range around 90° of +/−0.1°, 0.5°, 1°, 2°, 3°, 4°, and/or 5° degrees. In some cases, the above determination may be performed by determining whether a dot product of the first vector $\vec{v}_1$ and the second vector $\vec{v}_2$ is zero or substantially zero. In an embodiment, a vertex (e.g., vertex 512*b*) may be determined to a 3D corner, or to be included in a set of 3D corners, if the vertex satisfies the first length criterion, the second length criterion, and the orthogonality criterion discussed above. In an embodiment, each vertex of the plurality of vertices identified in operation 306 may be evaluated to determine whether the vertex is a 3D corner. If a vertex is a 3D vertex that satisfies the first and second length criteria but is not a 3D corner because it does not satisfy the orthogonality criterion, the 3D vertex may still be used to determine a fused corner, as discussed below in more detail.

In some embodiments, determining whether the first vector $\vec{v}_1$ and the second vector $\vec{v}_2$ (e.g., vector 551 and vector 552) are substantially orthogonal to each other may involve projecting (e.g., by the object identification manager 206) the two vectors to a shared plane, and then determining whether the projected vectors are substantially orthogonal. For instance, a portion/spatial segment extracted from the spatial structure data may include spatial information with a range of depth values and may represent a layer that forms an angled surface (e.g., relative to an image plane of the spatial structure sensing device 151 of FIGS. 1A-1C). In such situations, the first $\vec{v}_1$ and the second vector $\vec{v}_2$ may be out of plane with each other. To account for such situations, the object identification manager 206 (or, more generally, the processing circuit 110 of the computing system 101) may be configured to project the first vector $\vec{v}_1$ and the second vector $\vec{v}_2$ onto a shared plane and to use the angle between the projected vectors to determine whether they are substantially orthogonal to each other.

In an embodiment, operation 308 further involves determining a convexity of a vertex that is a 3D corner (i.e., determining a convexity of the 3D corner), or more generally whether the 3D corner is a convex corner. This determination may be performed by, e.g., the object identification manager 206. A convex corner of a shape may be a corner where an angle interior to the shape is less than 180°, while a concave corner a shape may be a corner where an angle exterior to the shape is less than 180°. For instance, vertex 512*b* in FIG. 5D may be a 3D corner because it satisfies the orthogonality criterion and may further be a convex corner because an angle 516 interior to the shape of FIG. 5D at the vertex 512*b* has an angle of substantially 90°, which is less than 180°. The vertex 512*d* in FIG. 5D may be a 3D corner because it also satisfies the orthogonality criterion but may be a concave corner because an angle 517 exterior to the shape of FIG. 5D at vertex 512*d* is substantially 90°, which is less than 180°. For a three-dimensional object, a convex corner of a shape can be understood as a corner for which a plane can be drawn that intersects the shape at only one point—the convex corner itself. Convex corners and concave corners may also be defined by the content of the space around them. For instance, a vertex may be understood as a point at which four quadrants intersect and determining a convexity of the vertex may involve determining how many quadrants contain a portion of the shape. If only one quadrant contains part of the shape, the vertex may be determined to be concave. If three quadrants contain part of the shape, the vertex may be determined to be convex.

Figure 5F:
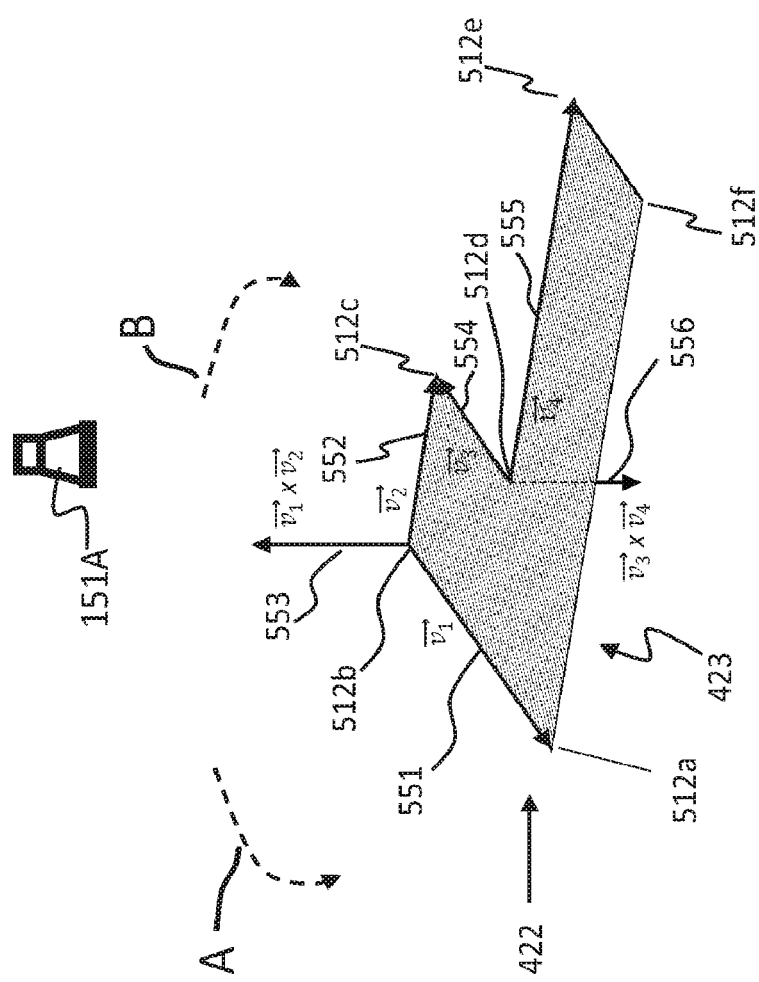

In an embodiment, determining whether a vertex that is a 3D corner is also a convex corner involves determining (e.g., by the object identification manager 206) a cross product of the first $\vec{v}_1$ and the second vector $\vec{v}_2$, which are the two vectors discussed above that point away from the vertex. The cross product may include or may be a cross product vector. For instance, FIG. 5F illustrates cross product vectors 553 and 556 that are a result of cross product operations. More specifically, the figure provides a perspective view of the layer 422. FIG. 5F also illustrates the location of the spatial structure sensing device 151A with respect to the captured spatial segment 422. In the example of FIG. 5F, the cross product vector 553 is a result of a cross product of vectors 551, 552, and is orthogonal to both vectors 551, 552. Further, the cross product vector 556 is a result of a cross product of vectors 554, 555. The direction of cross product vector 553 or 556, as determined by the right hand rule, may indicate whether a particular vertex that is a 3D corner (e.g., vertex 512*b* or vertex 512*d* in FIG. 5F) is also a convex corner or a concave corner. The right hand rule is a commonly used convention for determining the direction of a cross product vector. For example, consider the cross product equation $\vec{a} \times \vec{b} = \vec{c}$. Using the right hand, the index finger is pointed in the direction of $\vec{a}$ and the middle finger is pointed in the direction of $\vec{b}$. When the index finger and middle finger are arranged thusly, the extended thumb points in the direction of the cross product, $\vec{c}$. Determining whether a vertex is a convex corner may involve determining whether a direction of a cross product vector corresponding to the vertex matches a defined direction. As discussed below in more detail, the direction against which the cross product vector is matched may be a direction in which the computing system 101 is progressing through the plurality of vertices (of operation 306).

Because the cross product operation is anti-commutative, the ordering of the vectors and vertices influences the result of the above-described determination. For instance, if the processing circuit 110 of the computing system 101 is determining whether each vertex of the plurality of vertices is a 3D vertex, determining whether each vertex is a 3D corner, and/or determining whether each vertex is a convex corner, the ordering of the vertices may refer to whether the processing circuit 110 is performing the above determination in a sequence that progresses through the plurality of vertices in a clockwise manner or a counterclockwise manner. As an example, if the processing circuit 110 evaluates the vertices 512a, 512b, 512c, 512d, 512e, and 512f of FIG. 5D or 5F in that order to determine whether each vertex is a convex corner, the processing circuit 110 may be considered to be progressing through the vertices in a clockwise manner along a contour 423 of the layer 422. In such an example, the defined direction against which a cross product vector is compared may be a direction that is pointing out of the layer 422 depicted in FIG. 5F (also referred to as pointing upwards from the layer towards the spatial structure sensing device 151A). In this example, a vertex may be considered a convex corner if its cross product vector is pointing in or otherwise matches the defined direction and may be considered a concave corner if its cross product vector is not pointing in, or more generally does not match, the defined direction. For instance, if the vertices of FIG. 5F are evaluated, the cross product vector 553, which is a cross product of vectors 551 and 552, will point out of the layer 422 (or upwards from the layer) represented by the spatial segment. The cross product vector 533 may be considered to match the defined direction, and thus its corresponding vertex (512b) may be considered a convex corner. In the example of FIG. 5F, the first vector 551 points along the direction A, which may be considered a counterclockwise direction or considered a direction that follows a counterclockwise flow along the contour 423.

In an embodiment, the sequence that progresses through the plurality of vertices may be analogized to a flow that follows a contour (e.g., contour 423) that reaches the plurality of vertices of the contour consecutively in a clockwise manner or a counterclockwise manner, and the defined direction (against which a cross product vector is compared) may be opposite to that of a curl vector of the flow. For example, if the evaluation of the plurality of vertices progresses in a clockwise manner, the curl vector may point downward (away from the spatial structure sensing device 151A), as defined by the right hand rule. The defined direction may be opposite to that of the curl vector. If the plurality of vertices are evaluated in a counterclockwise manner, the curl vector may point upward.

In the example of FIG. 5F, operation 308 may determine that vertex 512d is a concave corner, or more generally that vertex 512d is not a convex corner. As stated above, vertex 512d may be considered a concave corner of the contour 423 because an angle exterior to the contour 423 at the vertex 512 is less than 180°. Determining whether the vertex 512d is a concave corner or a convex corner may also be based on a cross product of two vectors pointing away from the vertex toward two respective nearest neighboring vertices. For FIG. 5F, these two vectors are vectors 554, 555. Vector 554 points towards a nearest neighboring vertex in a direction that follows a counterclockwise progression, while vector 555 points toward a nearest neighboring vertex in a direction that follows a clockwise progression. The cross product of vectors 554, 556 includes a cross product vector 556. The cross product vector 556 points into the layer (also referred to as pointing downward, away from the spatial structure sensing device 151A). A direction of the cross product vector 556 (downward) may be opposite to the defined direction (upward). Thus, the vertex 512d corresponding to the cross product vector 556 may be considered to be a concave corner, or more generally not to be a convex corner.

As discussed above, the ordering of the vectors and vertices used in computing the cross product may affect a direction of the resulting cross product vector. In the example shown of FIG. 5F, the vertices can be evaluated over multiple respective iterations, in a sequence that progresses through the vertices in a clockwise manner (also referred to as a clockwise sequence), wherein a first vector $\vec{v}_1$ used to calculate the cross product points in a direction that follows a counterclockwise flow (from a current vertex towards a previous vertex), and a second vector $\vec{v}_2$ used to calculate the cross product points in a direction that follows a clockwise flow (from the current vertex towards a next vertex). The cross-product vector of $\vec{v}_1 \times \vec{v}_2$ may point in a direction toward the spatial structure sensing device 151A. In another example, the vertices may be evaluated in a sequence that progresses through the vertices in a counterclockwise manner (also referred to as a counterclockwise sequence). In such an example, the first vector $\vec{v}_1$ used to calculate the cross product points in a direction that follows a clockwise flow (from a current vertex towards a previous vertex), and a second vector $\vec{v}_2$ used to calculate the cross product points in a direction that follows a counterclockwise flow (from the current vertex towards a next vertex). The cross-product vector of $\vec{v}_1 \times \vec{v}_2$ may point in a direction away the spatial structure sensing device 151A. Thus, the cross product vectors in the two above examples may point in different directions, depending on whether the vertices are progressed through in a clockwise manner or in a counterclockwise manner. Thus, when identifying whether a vertex is a convex corner, the processing circuit 110 (e.g., executing the object identification manager 206) may take into account whether the vertices are being evaluated in a clockwise manner or a counterclockwise manner. For example, if the vertices are being evaluated in a clockwise manner, the processing circuit 110 may determine whether the defined direction (against which cross product vectors are compared) as a direction that points upward, toward the spatial structure sensing device 151A. If the vertices are being evaluated in a counterclockwise manner, the processing circuit 110 may determine whether the defined direction as a direction that points downward, away from the spatial structure sensing device 151A.

In embodiments, the processing circuit 110 (e.g., while executing object identification manager 206) may perform the determination of which vertices are 3D corners and the determination of which vertices are convex corners in any suitable order. In some embodiments, the determination of which vertices are 3D corners may have to be performed before determining which vertices are convex corners. The processing circuit 110 may evaluate all of the plurality of vertices of operation 306 to identify 3D corners before determining which vertices are also convex corners, or the processing circuit may begin identifying convex corners after only some vertices have been evaluated to determine whether those vertices are 3D corners. In some embodiments, the processing circuit may determine whether a particular vertex is a convex corner right after the vertex is determined as a 3D corner.

Figure 5G:
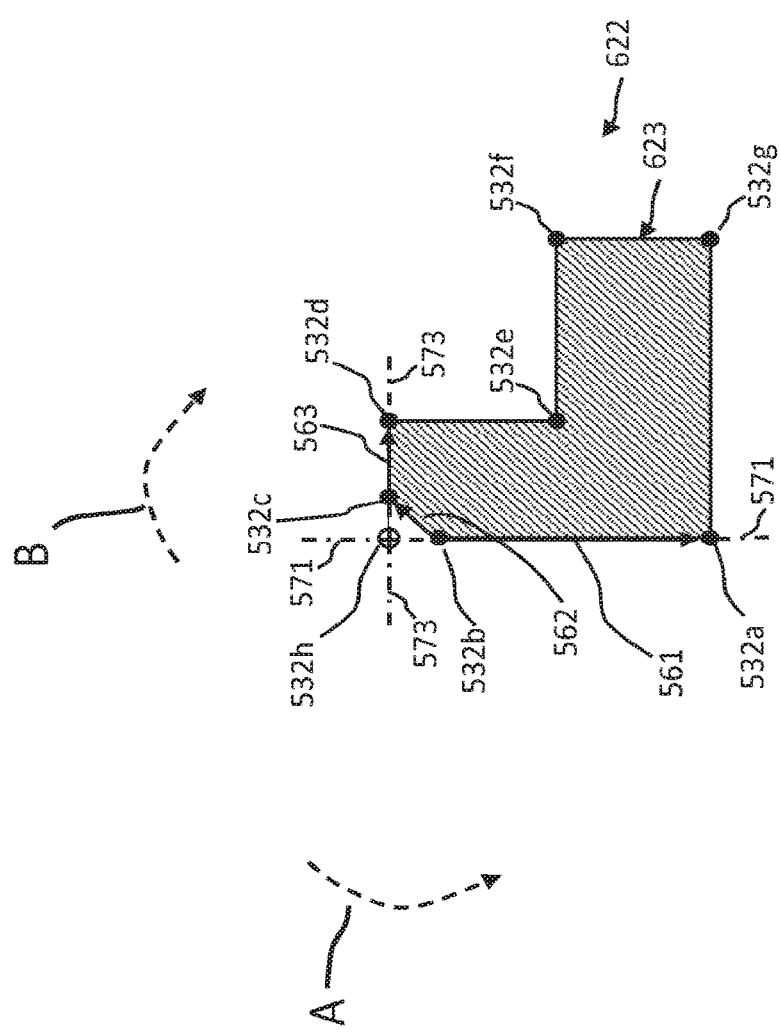

In an embodiment, operation 308 may involve determining a fused corner, which may be considered a convex corner. In some cases, the fused corner may be an orthogonal corner of a shape that approximates the object structure described by the spatial structure data, and that is near the vertex being evaluated. The fused corner may be determined as part of a corner fusion technique, which is discussed below in more detail. Such an embodiment may apply to circumstances in which a vertex is determined as a 3D vertex (because it satisfies the first length criterion and the second length criterion) but is not a 3D corner (because it does not satisfy the orthogonality criterion). For instance, FIG. 5G depicts a layer 622 of a structure that is described by a portion/spatial segment of spatial structure data, wherein the layer is extracted in, e.g., operation 304. More specifically, the figure depicts a plurality of vertices 532a-532g that describe a contour of the layer 622. The vertices may have been identified in, e.g., operation 306. In this example, vertex 532b may be a first vertex (e.g., current vertex) of the plurality of vertices while the vertex 532a may be a second vertex (e.g., a previous vertex), and the vertex 532c may be a third vertex (e.g., a next vertex). The vertex 532a may be a nearest (also referred to as closest) vertex to the vertex 532b in a first direction A along the contour of the layer 622, while the vertex 532c is a nearest vertex to the vertex 532b in a second direction B along the contour of the layer 622. A first vector 561 may be defined to extend from the vertex 532b to the vertex 532a, while a second vector 562 may be defined to extend from the vertex 532b to the vertex 532c. In this example, vertex 532b may be determined to be a 3D vertex because it satisfies the first length criterion and the second length criterion but is not considered to be a 3D corner because it does not satisfy the orthogonality criterion. The orthogonality criterion is not satisfied because the first vector 561 and the second vector 562 are not orthogonal to each other.

In such a situation, the processing circuit 110 may select a fourth vertex that is a second closest neighboring vertex to the first vertex in the second direction along the contour of the layer and may define a third vector between the fourth vertex and the third vertex. In the example of FIG. 5G, the fourth vertex is 532d, which is a second closest neighboring vertex to the vertex 532b along the direction B. Further, the third vector in this example is vector 563, which is between vertex 532c and vertex 532d, and more specifically is from vertex 532c to vertex 532d. In some cases, the processing circuit 110 may (e.g., by executing the object identification manager 206) determine whether the third vector satisfies a third length criterion by comparing the third vector 563 to the threshold length. In some cases, such a comparison may be omitted.

In the above example of the corner fusion technique, the processing circuit 110 may further determine or otherwise define a first line that extends along the first vector, and a second line that extends along the third vector. For example, FIG. 5G depicts an example in which the first line is line 571, and the second line is line 573. Line 571 may extend along the vector 561 and may extend past the vertex 532a and extend past the vertex 532b. Similarly, line 573 extends along the vector 563, and extends past the vertex 532c and 532d.

In the above example of the corner fusion technique, the processing circuit 110 may further identify an intersection point (e.g., point 532h of FIG. 5G) that is an intersection between the first line (e.g., 571) and the second line (e.g., 573). Upon identifying point 532h as a vertex, point 532h may be added to the plurality of vertices along with vertices 532a-g. As depicted in FIG. 5G, the intersection point 532h may be an imaginary point that is outside a shape formed by the layer depicted in the figure, or more specifically outside of a contour of the layer. In some cases, the processing circuit 110 may further determine whether the intersection point (e.g., 532h) satisfies the orthogonality criterion, such as by determining whether the first line (e.g., 571) is orthogonal or substantially orthogonal to the second line (e.g., 573). If the first line and the second line that define the intersection point are orthogonal to each other, the intersection point may be referred to as a fused corner.

In the above example of the corner fusion technique, the processing circuit 110 may further determine whether the fused corner is convex. In some cases, this determination may be based on determining a cross product of the first vector and the third vector, similar to the discussion above of a cross product between the first vector and the second vector. The convexity of the fused corner may be based on whether a direction of a corresponding cross product vector matches the defined direction discussed above. In some cases, determining whether the fused corner is convex may involve determining whether the fused corner is outside of the contour of the layer being described by the plurality of vertices. For instance, point 532h is a fused corner that is convex, because it is outside of the contour 623 of the layer 622. If the fused corner is determined to be convex, it may be identified as a convex corner of operation 308.

As stated above, determining whether a vertex is a 3D corner, or determining a fused corner based on the vertex, may be performed for each of a plurality of vertices, through a plurality of iterations. In the example discussed above with respect to FIG. 5G, the current iteration is being performed for vertex 532b, such that vertex 532b is the current vertex, and vertices 532a and 532c are the previous vertex and the next vertex, respectively, for that iteration. In the next consecutive iteration, the processing circuit 110 may progress to the next unchecked vertex. After identifying point 532h as a fused corner, the processing circuit 110 may skip vertex 532c, and proceed to determining whether vertex 532d is 3D vertex or 3D corner. Because vertex 532c was used in determining point 532h as a fused corner, it is not necessary to assess this point again.

In further embodiments, after identifying point 532h as a fused corner, the processing circuit may progress to a next nearest neighboring vertex to the point 532h. For instance, in this example, it may progress to vertex 532c. In this example, the vertex 532c becomes the current vertex, while point 532h, which has now been added to the plurality of vertices, and 532d are the previous vertex and next vertex, respectively, for that iteration. Because point 532h is on line 573, which connects vertices 532c and 532d, vertex 532c cannot satisfy the third criterion (orthogonality), and the processing circuit 110 will determine that vertex 532c is not a 3D vertex or 3D corner.

The corner fusion method, as described above, may be advantageous in multiple situations. Such situations may involve irregularly shaped object having non-perpendicular (i.e., angled or rounded) corners, and/or may involve a particular physical object having a corner that is obscured or obstructed in view relative to the spatial structure sensing device 151/151A of FIGS. 1A-1D and FIG. 5F. For example, a first object may have a corner that is obscured or obstructed in view by a second object that is stacked on top of the first object. In another example, a difference in coloring or material (e.g., reflective tape) at a corner of an object may result in an inaccurate spatial structure data capture. In such situations, the corner fusion technique may compensate for such inaccuracies.

Returning to FIG. 3, the method 300 further includes an operation 310, in which the processing circuit 110 of the computing system employs 101 performs object recognition according to the convex corners identified in operation 308. In some instances, operation 310 may be performed by the object recognition manager 208. In an embodiment, operation 310 may include generating a detection hypothesis, modifying a detection hypothesis, and/or filtering a detection hypothesis, as described herein.

Figure 6A:
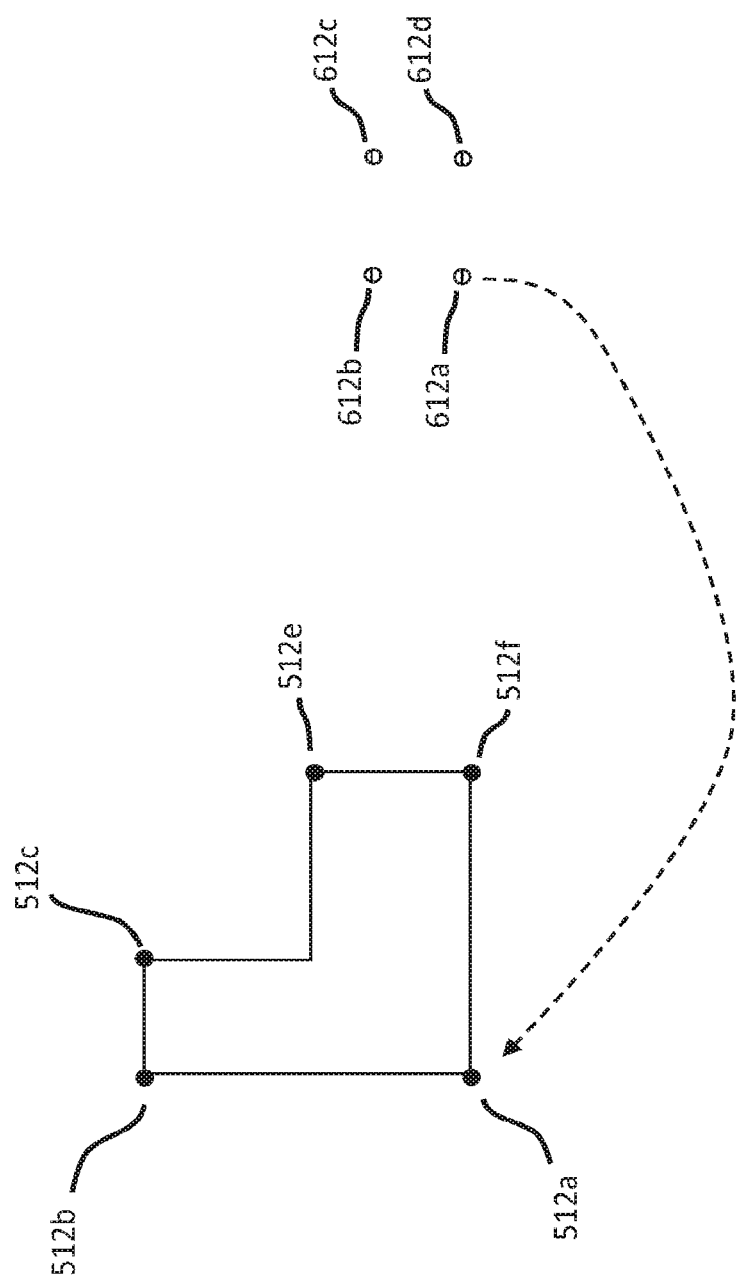
FIGS. 6A-6C illustrate aspects of the operation of a computing system consistent with embodiments hereof.

In an embodiment, a detection hypothesis may refer to an estimate of what object, type of object, and/or object orientation is being sensed by the spatial structure sensing device 151 of FIGS. 1A-1C. In some instances, the detection hypothesis may be a determination of whether a particular object or type of object (e.g., a particular type of box or other packaging) is being described by spatial structure data, such as the spatial structure data of operation 302. In some cases, the detection hypothesis may be a determined mapping between the spatial structure data and template features of a template, wherein the template describes an object structure. The template may describe the object structure through template features, such as a series of coordinates for corners, surfaces, and/or edges of the object structure. FIG. 6A depicts an example of a template for a particular type of object, such as a particular type of box that is part of the inventory at a warehouse. As stated above, the template may describe a plurality of features of the type of object, such as a series of coordinates that represent corners, edges, one or more surfaces, or some other features. In the example of FIG. 6A, the template includes four coordinates that describe four points 612a-612d on a particular type of object (e.g., a box). The four coordinates may represent, e.g., four corners of that type of object. In some implementations, a detection hypothesis may include an estimate, for one or more of the features in the template discussed above, of which one or more portions of the spatial structure data maps or otherwise correspond to the one or more features.

Figure 6B:
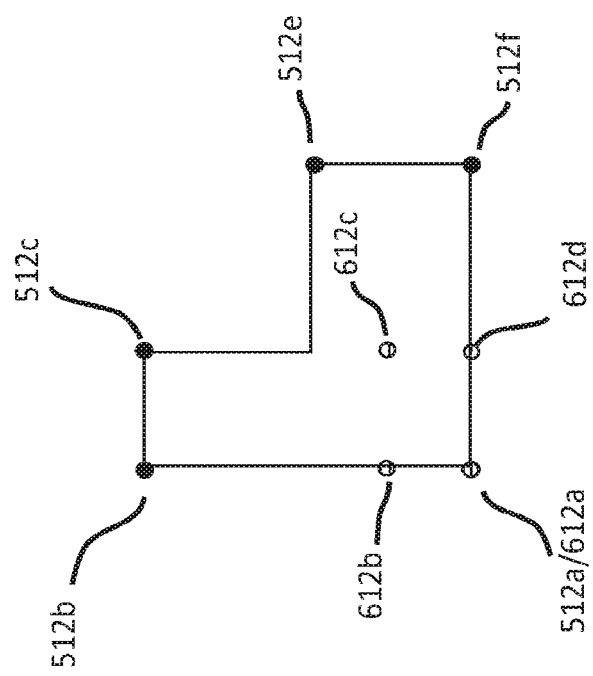

In an embodiment, operation 310 involves using the convex corners identified in operation 308 to generate a detection hypothesis. For example, the convex corner represented by point 512a in FIG. 6A may be used to generate a detection hypothesis. The detection hypothesis in FIG. 6A may be an estimated mapping, which maps point 612a of the template to the convex corner represented by point 512a, as illustrated in FIGS. 6A and 6B. In some cases, the detection hypothesis may also involve a determination that the points 612a-612d of the template are to be aligned with the identified convex corners. For instance, such a determination may involve the points 612a-612d having an orientation such that a line between points 612a and 612d is parallel with a line between the points 512a and 512f, and/or such that a line between points 612a and 612b is parallel with a line between points 512a and 512b. Using the convex corners of step 308 to generate a detection hypothesis may increase a chance that the detection hypothesis is correct.

More specifically, the convex corners that are identified in operation 308 may more likely correspond to physical features of a structure of one or more objects (e.g., 401, 402 of FIG. 4A), such as corners of the one or more objects. If the template also identifies physical features of a particular object or type of object, then a detection hypothesis in which a feature of the template is matched to a convex corner may have a higher likelihood of being accurate. In some cases, the detection hypothesis may be modified and refined, and the convex corners may provide a starting point for determining a correct detection hypothesis. Thus, in an embodiment, operation 310 may involve determining whether the convex corners align with features in a template that defines an object shape.

Figure 6C:
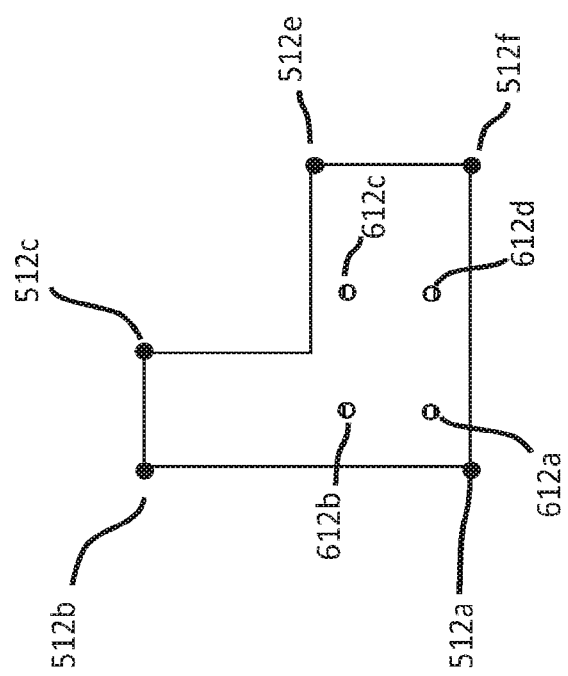

In an embodiment, operation 310 may involve determining whether to filter out or otherwise ignore a detection hypothesis. More generally speaking, such an embodiment may involve determining whether the detection hypothesis is likely to be incorrect. For instance, FIG. 6C depicts another detection hypothesis, which involves another estimate of which portion of the template (represented by points 612a-612d) are mapped to another portion of the spatial structure data. In this embodiment, because none of the template features are mapped to a convex corner (e.g., point 512a), the detection hypothesis may be filtered or otherwise ignored for purposes of object recognition. In another example, a detection hypothesis may have to map at least one template feature of a template to a portion of the spatial structure data that represents a location which is sufficiently close to a convex corner. If the detection hypothesis does not map any template feature to a location that is sufficiently close to a convex corner, the detection hypothesis may be filtered out.

Further embodiments consistent with the disclosure include at least the following.

Embodiment 1 is a computing system, comprising a non-transitory computer-readable medium; at least one processing circuit configured, when spatial structure data describing object structure is stored in the non-transitory computer-readable medium, to: access the spatial structure data, the spatial structure data having depth information indicative of a plurality of layers for the object structure; extract, from the spatial structure data, a portion of the spatial structure data representative of one layer of the plurality of layers; identify, from the portion of the spatial structure data, a plurality of vertices that describe a contour of the layer; identify convex corners of the layer based on the plurality of vertices; and perform object recognition according to the convex corners.

Embodiment 2 is the computing system of embodiment 1, wherein the spatial structure data includes a point cloud that identifies a plurality of points which represent respective locations on one or more surfaces of the object structure, and wherein the portion of the spatial structure data that is extracted identifies a set of points which represent a portion of the plurality of points and which are representative of the layer.

Embodiment 3 is the computing system of embodiment 2, wherein the processing circuit is configured to identify the plurality of vertices that describe the contour of the layer by: identifying a plurality of line segments that form straight edges for the set of points representing the layer and identifying the plurality of vertices as endpoints of the line segments.

Embodiment 4 is the computing system of embodiment 2 or 3, wherein the processing circuit is configured to identify the plurality of vertices that describe the contour of the layer by: identifying a plurality of edge points from among the set of points, wherein the edge points represent points that are on a periphery of the set of points; determining a plurality of lines that fit through the plurality of edge points; and identifying, as the plurality of vertices, intersection points at which the plurality of lines intersect.

Embodiment 5 is the computing system of any of embodiments 1-4, wherein the processing circuit is further configured to identify the convex corners of the layer from among the plurality of vertices by: determining a relationship that is indicative of at least a distance or distances between two or more vertices from among the plurality of vertices; identifying a subset of the plurality of vertices as 3D corners according to the relationship; and identifying, as the convex corners, 3D corners that are convex.

Embodiment 6 is the computing system of embodiment 5, wherein the relationship is further indicative of respective angles formed by pairs of vectors, each of the vectors extending between a pair of vertices of the plurality of vertices.

Embodiment 7 is the computing system of any of embodiments 1 to 6, wherein the processing circuit is further configured to identify the convex corners of the layer from among the plurality of vertices by: identifying a set of 3D vertices from among the plurality of vertices, identifying a set of 3D corners from among the set of 3D vertices, and identifying at least some of the convex corners from among the set of 3D corners, wherein the set of 3D vertices include vertices that each has a respective distance to a nearest neighboring vertex which is equal to or exceeds a defined threshold length, and excludes any vertex that has a respective distance to a nearest neighboring vertex which is less than the defined threshold length, and wherein the set of 3D corners include 3D vertices, from among the set of 3D vertices, that represent an orthogonal corner of the object structure.

Embodiment 8 is the computing system of embodiment 7, wherein the processing circuit is further configured to identify the set of 3D corners by determining whether to include a first vertex of the plurality of vertices into the set of 3D corners, by: selecting, from among the plurality of vertices, a second vertex that is a nearest neighboring vertex to the first vertex in a first direction along the contour of the layer; defining a first vector that is from the first vertex to the second vertex; selecting, from among the plurality of vertices, a third vertex that is a nearest neighboring vertex to the first vertex in a second direction along the contour of the layer, the second direction being different from the first direction; defining a second vector that is from the first vertex to the third vertex; determining whether the first vertex satisfies a first length criterion by comparing a first length of the first vector to the defined threshold length; determining whether the first vertex satisfies a second length criterion by comparing a second length of the second vector to the defined threshold length; determining whether the first vertex satisfies an orthogonality criterion by determining whether the first vector and the second vector are substantially orthogonal to each other; and in response to a determination that the first vertex does not satisfy the first length criterion, that the first vertex does not satisfy the second length criterion, or that the first vertex does not satisfy the orthogonality criterion, determining to exclude the first vertex from the set of 3D corners, in response to a determination that the first vertex satisfies the first length criterion, that the first vertex satisfies the second length criterion, and that the first vertex satisfies the orthogonality criterion, determining to include the first vertex in the set of 3D corners.

Embodiment 9 is the computing system of embodiment 8, wherein the processing circuit is further configured, in response to a determination to include the first vertex as a 3D corner in the set of 3D corners, to further determine whether the 3D corner is a convex corner by determining a cross product of the first vector and the second vector to determine a convexity of the 3D corner.

Embodiment 10 is the computing system of embodiment 9, wherein determining the cross product includes determining a cross product vector, and wherein determining whether the 3D corner is a convex corner includes determining whether a direction of the cross-product vector matches a defined direction.

Embodiment 11 is the computing system of embodiment 10, wherein the processing circuit is configured to determine, for each vertex of the plurality of vertices, whether to include the vertex as a respective 3D corner in the set of 3D corners, and to perform the determination in an sequence that progresses through the plurality of vertices along the contour of the layer in a clockwise manner or a counterclockwise manner, and wherein the defined direction against which the direction of the cross product vector is compared depends on whether the sequence progresses through the plurality of vertices in the clockwise manner or whether the sequence progresses through the plurality of vertices in the counterclockwise manner.

Embodiment 12 is the computing system of any of embodiments 8 to 11, wherein the processing circuit is configured, in response to a determination that the first vertex does not satisfy the orthogonality criterion, to determine a fused corner based on the first vertex, wherein the fused corner is an orthogonal corner of a shape that is based on the object structure, and is determined by: selecting a fourth vertex that is a second nearest neighboring vertex to the first vertex in the second direction along the contour of the layer; defining a third vector between the fourth vertex and the third vertex; determining a first line that extends along the first vector, and a second line that extends along the third vector; identifying an intersection point between the first line and the third line; determining whether the intersection point satisfies the orthogonality criterion by determining whether the first line and the third line are substantially orthogonal to each other; and identifying the intersection point as the fused corner in response to a determination that the intersection point satisfies the orthogonality criterion.

Embodiment 13 is the computing system of embodiment 12, wherein the processing circuit is configured: to determine whether the fused corner is convex by determining whether the fused corner is outside of the contour of the layer, and to identify the fused corner as one of the convex corners in response to a determination that the fused corner is convex.

Embodiment 14 is the computing system of any of embodiments 8 to 13, wherein the processing circuit is further configured to project the first vertex, the second vertex, and the third vertex onto a shared plane prior to defining the first vector and the second vector and prior to determining whether the first vertex satisfies the first length criterion, the second length criterion, and the orthogonality criterion.

Embodiment 15 is the computing system of any of embodiments 1 to 14, wherein the processing circuit is further configured to perform the object recognition by generating a detection hypothesis according to the convex corners.

Embodiment 16 is the computing system of any of embodiments 1 to 15, wherein the processing circuit is configured to perform object recognition by determining, based on the convex corners, how to map the spatial structure data, which describes the object structure, to features in a template that also describes the object structure.

Embodiment 17 is the computing system of any of embodiments 1 to 16, wherein the processing circuit is further configured to perform the object recognition by modifying a detection hypothesis according to the convex corners.

Embodiment 18 is a non-transitory computer-readable medium having instructions stored thereon that, when executed by a processing circuit, causes the processing circuit to: access spatial structure data that describes object structure, wherein the spatial structure data has depth information indicative of a plurality of layers for the object structure; extract, from the spatial structure data, a portion of the spatial structure data representative of one layer of the plurality of layers; identify, from the portion of the spatial structure data, a plurality of vertices that describe a contour of the layer; identify convex corners of the layer based on the plurality of vertices; and perform object recognition according to the convex corners.

Embodiment 19 is the non-transitory computer-readable medium of embodiment 18, wherein the instructions, when executed by the processing circuit, cause the processing circuit to identify the convex corners of the layer from among the plurality of vertices by: determining a relationship that is indicative of at least a distance or distances between two or more vertices from among the plurality of vertices; identifying a subset of the plurality of vertices as 3D corners according to the relationship; and identifying, as the convex corners, 3D corners that are convex.

Embodiment 20 is a method performed by a computing system, the method comprising: accessing spatial structure data that describes object structure, wherein the spatial structure data has depth information indicative of a plurality of layers for the object structure; extracting, from the spatial structure data, a portion of the spatial structure data representative of one layer of the plurality of layers; identifying, from the portion of the spatial structure data, a plurality of vertices that describe a contour of the layer; and identifying convex corners of the layer based on the plurality of vertices; and performing object recognition according to the convex corners.

It will be apparent to one of ordinary skill in the relevant arts that other suitable modifications and adaptations to the methods and applications described herein can be made without departing from the scope of any of the embodiments. The embodiments described above are illustrative examples and it should not be construed that the present invention is limited to these particular embodiments. It should be understood that various embodiments disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the methods or processes). In addition, while certain features of embodiments hereof are described as being performed by a single component, module, or unit for purposes of clarity, it should be understood that the features and functions described herein may be performed by any combination of components, units, or modules. Thus, various changes and modifications may be affected by one skilled in the art without departing from the spirit or scope of the invention as defined in the appended claims.

The invention claimed is:

1. A computing system, comprising:
a non-transitory computer-readable medium; and
at least one processing circuit configured, when three-dimensional (3D) spatial structure data describing object structure is stored in the non-transitory computer-readable medium, to:
identify, from the 3D spatial structure data, a plurality of vertices that describe a contour of the object structure;
identify which of the plurality of vertices satisfies a 3D corner criterion based on the 3D spatial structure data;
identify convex corners associated with the object structure based on the vertices satisfying the 3D corner criterion; and
perform object recognition according to the convex corners.

2. The computing system of claim 1, wherein the at least one processing circuit is further configured, when the 3D spatial structure data is stored in the non-transitory computer-readable medium and the 3D spatial structure data has depth information indicative of a plurality of layers for the object structure, to extract, from the 3D spatial structure data, a portion of the 3D spatial structure data representative of a layer of the plurality of layers for the object structure, wherein the contour that is identified is a contour of the layer.

3. The computing system of claim 1, wherein the 3D spatial structure data includes a point cloud that identifies a set of points which represent respective locations on one or more surfaces of the object structure.

4. The computing system of claim 3, wherein the at least one processing circuit is configured to identify the plurality of vertices that describe the contour of the object structure by:
identifying a plurality of line segments that form straight edges for the set of points, and
identifying the plurality of vertices as endpoints of the plurality of line segments.

5. The computing system of claim 3, wherein the at least one processing circuit is configured to identify the plurality of vertices that describe the contour by:
identifying a plurality of edge points from among the set of points, wherein the plurality of edge points represent points that are on a periphery of the set of points;
determining a plurality of lines that fit through the plurality of edge points; and
identifying, as the plurality of vertices, intersection points at which the plurality of lines substantially intersect.

6. The computing system of claim 1, wherein the at least one processing circuit is further configured to identify the convex corners from among the plurality of vertices by:
determining a relationship that is indicative of at least a distance or distances between two or more vertices from among the plurality of vertices;
identifying the plurality of vertices that satisfy the 3D corner criterion according to the relationship; and
identifying, as the convex corners, 3D corners that are convex.

7. The computing system of claim 1, wherein the plurality of vertices include vertices that each has a respective distance to a nearest neighboring vertex which is equal to or exceeds a defined threshold length, and excludes any vertex that has a respective distance to a nearest neighboring vertex which is less than the defined threshold length, and
wherein the plurality of vertices that satisfy the 3D corner criterion represent an orthogonal corner of the object structure.

8. The computing system of claim 7, wherein the at least one processing circuit is further configured to determine whether a first vertex of the plurality of vertices satisfies the 3D corner criterion by:
selecting, from among the plurality of vertices, a second vertex that is a nearest neighboring vertex to the first vertex in a first direction along the contour;
defining a first vector that is from the first vertex to the second vertex;
selecting, from among the plurality of vertices, a third vertex that is a nearest neighboring vertex to the first vertex in a second direction along the contour, the second direction being different from the first direction;
defining a second vector that is from the first vertex to the third vertex;
determining whether the first vertex satisfies a first length criterion by comparing a first length of the first vector to the defined threshold length;
determining whether the first vertex satisfies a second length criterion by comparing a second length of the second vector to the defined threshold length;
determining whether the first vertex satisfies an orthogonality criterion by determining whether the first vector and the second vector are substantially orthogonal to each other; and
in response to a determination that the first vertex does not satisfy the first length criterion, that the first vertex does not satisfy the second length criterion, or that the first vertex does not satisfy the orthogonality criterion, determining that the first vertex does not satisfy the 3D corner criterion; or
in response to a determination that the first vertex satisfies the first length criterion, that the first vertex satisfies the second length criterion, and that the first vertex satisfies the orthogonality criterion, determining that the first vertex satisfies the 3D corner criterion.

9. The computing system of claim 8, wherein the at least one processing circuit is further configured, in response to a determination that the first vertex satisfies the 3D corner criterion, to further determine whether the first vertex represents a convex corner by determining a cross product of the first vector and the second vector to determine a convexity.

10. The computing system of claim 9, wherein determining the cross product includes determining a cross product vector, and wherein determining the convexity includes determining whether a direction of the cross product vector matches a defined direction;
wherein the at least one processing circuit is configured to perform the identification of the plurality of vertices that satisfy the 3D corner criterion in a sequence that progresses through the plurality of vertices along the contour in a clockwise manner or a counterclockwise manner; and
wherein the defined direction with which the direction of the cross product vector is compared depends on whether the sequence progresses through the plurality of vertices in the clockwise manner or whether the sequence progresses through the plurality of vertices in the counterclockwise manner.

11. The computing system of claim 8, wherein the at least one processing circuit is configured, in response to a determination that the first vertex does not satisfy the orthogonality criterion, to determine a fused corner based on the first vertex, wherein the fused corner is an orthogonal corner of a shape that is based on the object structure, and is determined by:
selecting a fourth vertex that is a second nearest neighboring vertex to the first vertex in the second direction along the contour;
defining a third vector between the fourth vertex and the third vertex;
determining a first line that extends along the first vector, and a third line that extends along the third vector;
identifying an intersection point between the first line and the third line;
determining whether the intersection point satisfies the orthogonality criterion by determining whether the first line and the third line are substantially orthogonal to each other; and
identifying the intersection point as the fused corner in response to a determination that the intersection point satisfies the orthogonality criterion.

12. The computing system of claim 11, wherein the at least one processing circuit is configured:
to determine whether the fused corner is convex by determining whether the fused corner is outside of the contour of the object structure; and
to identify the fused corner as one of the convex corners in response to a determination that the fused corner is convex.

13. The computing system of claim 8, wherein the at least one processing circuit is further configured to project the first vertex, the second vertex, and the third vertex onto a shared plane prior to defining the first vector and the second vector and prior to determining whether the first vertex satisfies the first length criterion, the second length criterion, and the orthogonality criterion.

14. The computing system of claim 1, wherein the at least one processing circuit is further configured to control robot interaction with the object structure according to the convex corners.

15. The computing system of claim 1, wherein the at least one processing circuit is configured to perform object recognition by determining, based on the convex corners, how to map the 3D spatial structure data, which describes the object structure, to features in a template that also describes the object structure.

16. The computing system of claim 1, wherein the at least one processing circuit is further configured to perform object recognition by modifying a detection hypothesis according to the convex corners.

17. A non-transitory computer-readable medium having instructions stored thereon that, when executed by at least one processing circuit, causes the at least one processing circuit to:
identify, from three-dimensional (3D) spatial structure data that describes an object structure, a plurality of vertices that describe a contour of the object structure;
identify which of the plurality of vertices satisfies a 3D corner criterion based on the 3D spatial structure data;
identify convex corners associated with the object structure based on the vertices satisfying the 3D corner criterion; and
perform object recognition according to the convex corners.

18. The non-transitory computer-readable medium of claim 17, wherein the instructions, when executed by the at least one processing circuit, cause the at least one processing circuit to identify the convex corners from among the plurality of vertices by:
- determining a relationship that is indicative of at least a distance or distances between two or more vertices from among the plurality of vertices;
- identifying the plurality of vertices that satisfy the 3D corner criterion according to the relationship; and
- identifying, as the convex corners, 3D corners that are convex.

19. A method performed by a computing system, the method comprising:
- identifying, from three-dimensional (3D) spatial structure data that describes an object structure, a plurality of vertices that describe a contour of the object structure;
- identifying which of the plurality of vertices satisfies a 3D corner criterion based on the 3D spatial structure data;
- identifying convex corners associated with the object structure based on the vertices satisfying the 3D corner criterion; and
- performing object recognition according to the convex corners.

* * * * *